United States Patent [19]

Gilbert et al.

[11] 3,753,234

[45] Aug. 14, 1973

[54] MULTICOMPUTER SYSTEM WITH SIMULTANEOUS DATA INTERCHANGE BETWEEN COMPUTERS

[75] Inventors: Edward O. Gilbert; Elmer G. Gilbert; Edward J. Fadden; Thomas D. Berge, all of Ann Arbor, Mich.

[73] Assignee: Reliance Electric Company, Ann Arbor, Mich.

[22] Filed: Feb. 25, 1972

[21] Appl. No.: 229,575

Related U.S. Application Data

[63] Continuation of Ser. No. 791,064, Jan. 14, 1969.

[52] U.S. Cl. .......... 340/172.5
[51] Int. Cl. .......... G06f 15/16
[58] Field of Search .......... 340/172.5

[56] References Cited

UNITED STATES PATENTS

| | | | |
|---|---|---|---|
| 3,263,219 | 7/1966 | Brun et al. | 340/172.5 |
| 3,521,238 | 7/1970 | Gunderson | 340/172.5 |
| 3,350,689 | 10/1967 | Underhill et al. | 340/172.5 |

*Primary Examiner*—Harvey E. Springborn
*Attorney*—Richard G. Stephens

[57] ABSTRACT

A multicomputer system including a plurality of stored program digital computer units which are enabled to communicate directly with each other over one or more data interchange network means to allow a plurality of such computer units to simultaneously execute different programs to solve different portions of a problem which cannot conveniently be divided into independent programs. In one embodiment the starting and stopping of the various computer units and some data transmission between various computer units is governed by a computational flow director and a data mask unit to which each computer unit is connected. Use of a single data interchange network allows one computer to receive data from a single other computer unit, or transmit data to a selected group of other computer units, at any given time. In a further embodiment shown using serial data transmission, many computer units simultaneously man both send and receive data to and from many other computer units. In a further preferred embodiment shown using parallel data transmission, starting and stopping of computer units and data routing to the various units is controlled over the same data interchange network over which data is routed, eliminating the requirement for the computational flow director and various other equipment. The use of plural data interchange networks is shown, with conflict-determining circuitry to prevent a computer from being addressed simultaneously by more than one other computer unit.

10 Claims, 23 Drawing Figures

Patented Aug. 14, 1973 3,753,234

20 Sheets-Sheet 3

INSTRUCTION FORMAT

CLASS C FORMAT

Patented Aug. 14, 1973 3,753,234

20 Sheets-Sheet 17

Patented Aug. 14, 1973 3,753,234

20 Sheets-Sheet 19

MULTICOMPUTER SYSTEM WITH SIMULTANEOUS DATA INTERCHANGE BETWEEN COMPUTERS

Figure 1:
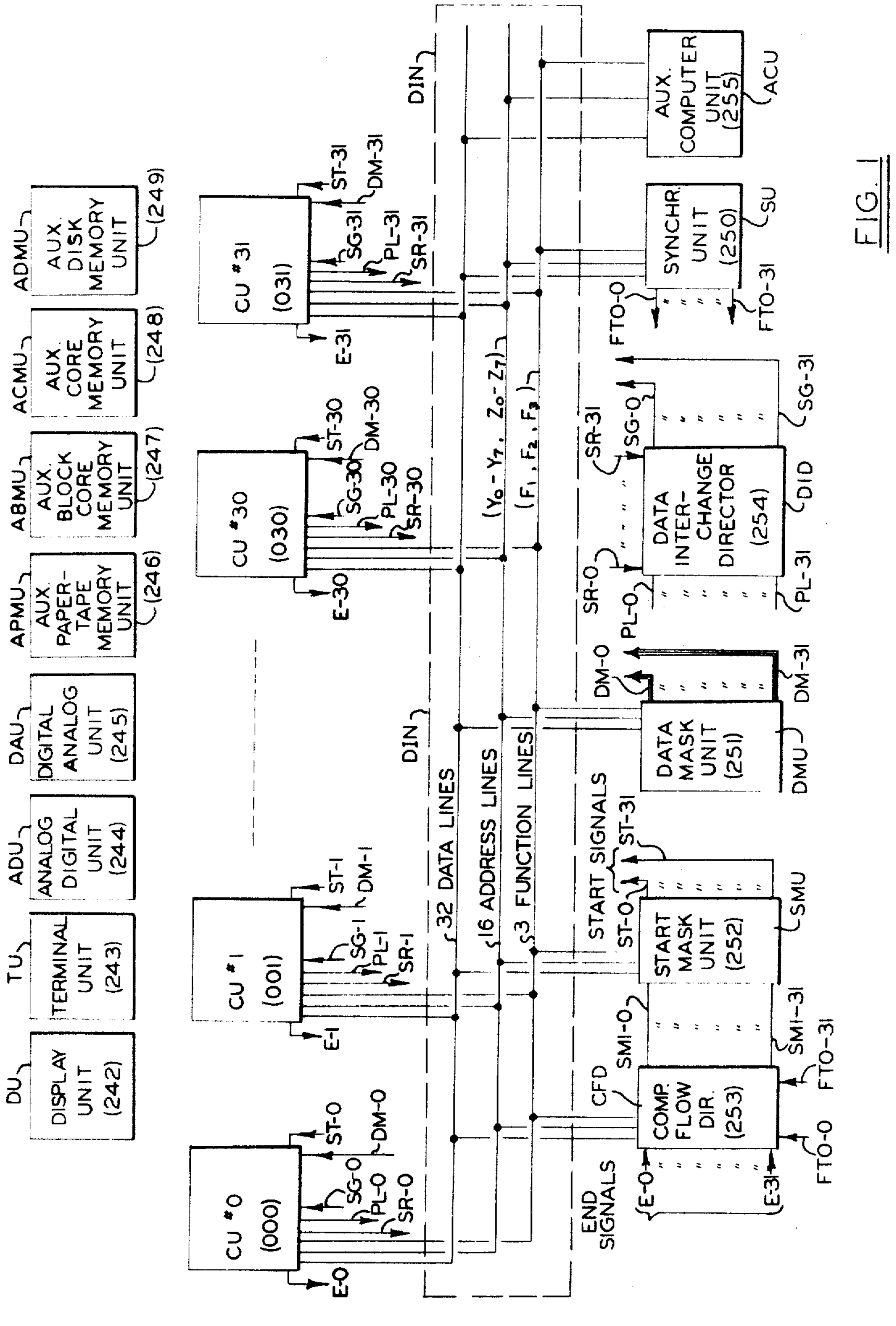

This application is a continuation or our prior co-pending application Ser. No. 791,064 filed Jan. 14, 1969.

This invention relates to a computer system, or multicomputer, comprising a plurality of stored-program digital computers and arrangements by means of which such computers may be arranged to communicate directly with each other, and with peripheral memory and input-output units, particularly to provide accurate and rapid solution of very complex problems, many of which have not been able to be solved satisfactorily by prior art computing systems. The computing system of the present invention is particularly applicable to the solution of not only many differential equation problems which heretofore have been solved on electronic analog computers, but applicable to very complex problems involving sets of partial differential equations, typified by weather prediction problems, also applicable to various complex problems invovlving many matrix and vector operations, and also applicable to problems involving convolution operations.

In the prior art many complex problems have been solved on generalpurpose electronic analgo computers, sometimes with a digital computer interconnected with the analog computer to provide a hybrid computing system. General purpose analog computers may be characterized as having very high speed and a very low cost-per-problem-solution as cmpared to contemporary digital computers. The manner in which analog computers are programmed also often advantageously provides the computer operator with an "interaction" with the problem being solved, giving him a better understanding of the problem. Analog computer systems are also advantageous in that they may be connected very easily to real-time processes and systems with a minimum of interface hardware. The generally "parallel" structure of an analog computer, wherein all or most computing elements operate simultaneously, advantageouly allows most simulation problems to be solved in real time. Some important disadvantages of analog computers, however, for some types of problems are (1) that the programmer must be a specialist who is aware of the limitations of both analog and digital hardware, (2) that considerable time and effort must be devoted to devising set-up sheets and patching lists to program a given problem, and (3) that the patching systems utilized with analog computers require considerable time to connect and are inconvenient to store. Furthermore, and often very importantly, the accuracy of any problem solution is limited. The mentioned hybrid systems are further disadvantageous in that very complex interface equipment (analog to digital and digital to analog conversion equipment) is usually required.

Conventional digital single-processor computer systems offer advantages over analog and hybrid analog-digital systems for some applications. In general much higher accuracy is attainable, and numerical analysis is more readily accomplished than with analog systems. Such a digital system ordinarily can be used for accounting and similar tasks as well as on scientific problems, and because all problems are programmed in substantially the same manner, much less skill is required from the programmer. In the solution of many complex scientific problpms, however, most conventional digital single processors are comparatively slow (except in the cases of some extremely large, extremely expensive systems, e.g., CDC 6600, CDC 7600, IBM 91, and IBM 85) and the cost per problem solution is invariably high. Operator interaction with the digital computer is poor compared to that of analog types, the interconnection of such a computer with real-time processes and systems requires high analog to digital and digital to analog conversion rates, and communication with outside systems ties up the central processor and/or memory. Furthermore, it is extremely difficult to add digital equipment in parallel to a given single-processor in order to speed up the solution of a problem. And although less skilled programmers frequently may be used, high level special programming languages are often required for the solution of differential equations.

A large number of scientific problems cannot be solved satisfactorily by either present analog systems, present analog-digital systems, or by known forms of single processor digital systems. A complex weather problem, for example, involving conditions throughout one hemisphere can only involve a few data points when such a problem is set up on a contemporary analog computer, and to solve such a problem with the desired number of data points well might require an impractically large and expensive analog computer, such as one having 10,000 electronic amplifier-intergrator circuits, for example, to provide adequate analog memory capability. While the provision of adequate memory capability may be readily possible in a single-processor digital system, the extremely large number of successive computations required for the digital system to provide a solution makes the digital system far too slow for various applications.

In attempts to provide apparatus suitable for some such extremely complex problems, three general techniques have been proposed in the prior art. A brute-force proposal for use with main central processors involves the use of very fast digital techniques, including, for example, the use of single instruction and data streams, instruction "look ahead" techniques, "pipeline computation" techniques, block data transfers, and the use of I/O computers to buffer the high speed memory of the central processing unit (CPU) from the user. Several multiprocessor systems proposed in the prior art involve a plurality (such as three or four) central processor units, all of which are connected through a switching system to receive instructions and data from a common memory system, and to return data either to the common memory or to various I/O computers or peripheral devices which are also connected to the switching system, and in such arrangements several of the central processor units have been arranged to operate simultaneously, so that several portions of the program stored in the central or common memory are executed simultaneously. In such systems each of the processor units operates substantially independently of each other processr, and each processor handles a problem which is largely unrelated to, or which can be solved independently of, the problems solved by the other processors. Such multiprocessor systems usually require very complex software, which may comprise the program of one of the processors or which may be stored in one of the I/O units. A third proposed technique involving "array processing" is typified by the Solomon I and Solomon II computers, the Illiac IV computer and the IBM 2938 array processor system attachment. The mentioned Solomon and Illiac IV computer systems involve an array of "processing elements" arranged in an array or two-dimensional matrix, with each such processing element made capable of processing and storing data words and of transferring data words to its four neighboring processing elements in the array, with each such processing element operating under the control of a programmed central controller, so that a given single instruction in the program of the central controller may be excuted simultaneosly by a plurality of the processing elements. While such array processors may be quite useful for highly structured or very specialized problems which principally involve matrix or vector operations when the same calculations can be performed simultaneously on plural sets of data, they are incapable of satisfactorily handling a large number of problems of a scientific nature, and particularly those types of problems where many different programs msut be run simultaneously on different sets of data, with a high degree of simultaneity interlinking the diferent programs.

The present invention, which may be termed a multicomputer, includes a plurality of individual stored-program digital computers connected in an arrangement which allows groups of the individual computers to solve portions of a complex problem simultaneously. Each of the individual digital computers of the present invention includes its own arithmetic unit, its own memory for data and instructions, and its own control unit. Unlike the above-mentioned multiprocessor systems, wherein each one of a plurality of simultaneoulsy operating processors operates substantially independently on a separable portion of a problem, the multicomputer of the present invention is applicable to the solution of unitary problems which cannot conveniently be divided into a group of independent sub-problems. In the solution of a great many scientific problems, such as the solution of a set of simultaneous partial differential equations, new data computed by one computer may be needed at many different times by various of the other simultaneously-operating computers in order for the latter to proceed through their programs, so that many data words have to be routed between the various computers as they execute their programs. It is one object of the present invention to provide an improved computer system in which a plurality of stored program computers are interconnected so that each may transmit words to and receive words directly from each other, with single instructions. In a great many such problems a data word computed by one computer may be required by a large number of other computers, and another object of the invention is to provide a system by means of which a word calculated by a given computer may be routed simultaneously with a single instruction to a selected group of other computers, and in which the selection of the group of other computers arranged to receive the word may be varied at will. In typical problems for which the present invention is particularly useful, groups of inter-related simultaneously-operating computers may each include an integration routine, for example, and for data computed by one computer to be accurate for use by another computer of such a group it is necessary that all computers of the group integrate between the same two time intervals, even though the programs of the various computers of the group all may be of different lengths and require different times, and unknown lengths of times, to execute. Another object of the present invention is to provide an arrangement by means of which groups of simultaneously operating computers executing widely-differing programs, or "sub-programs" of the entire problem, may be started through their sub-programs at proper instants after other groups of computers have completed desired calculations, where the selection of how many and which computers shall be in each group may be controlled as desired, and even made dependent upon the results of calculations performed by various of the computers. A further important object of the present invention is to provide a system of the type described which is economical to construct, and which is relatively simple and straightforward to program.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a block diagram of one illustrative form of the multicompu-ter of the present invention showing a plurality of computer units, a data interchange network by means of which the computer units are enabled to directly communicate with each other, and a plurality of peripheral devices which may be associated with the multicomputer.

Figure 1A:
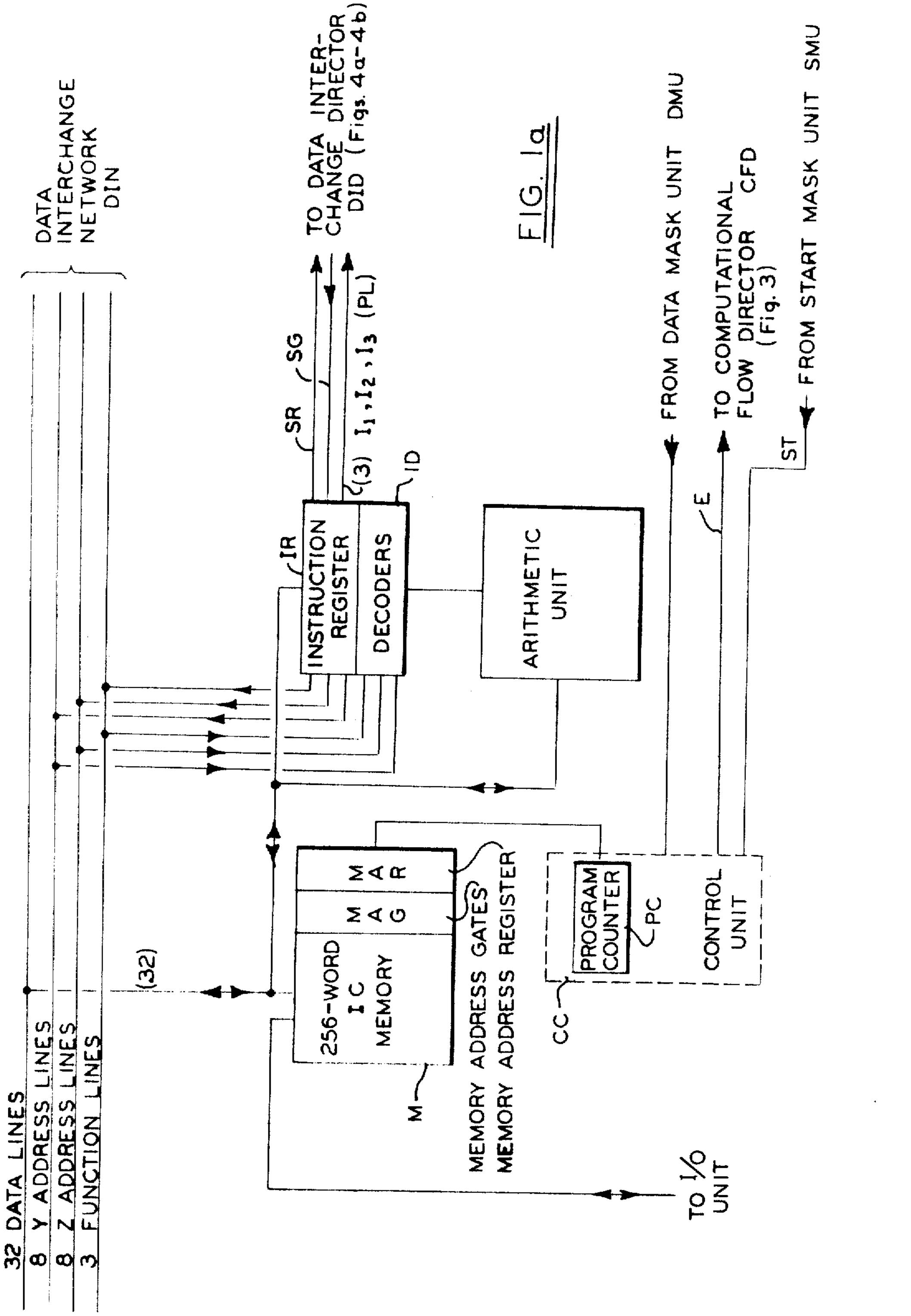

FIG. 1*a* is a block diagram of a single one of the computer units of FIG. 1.

Figure 2:
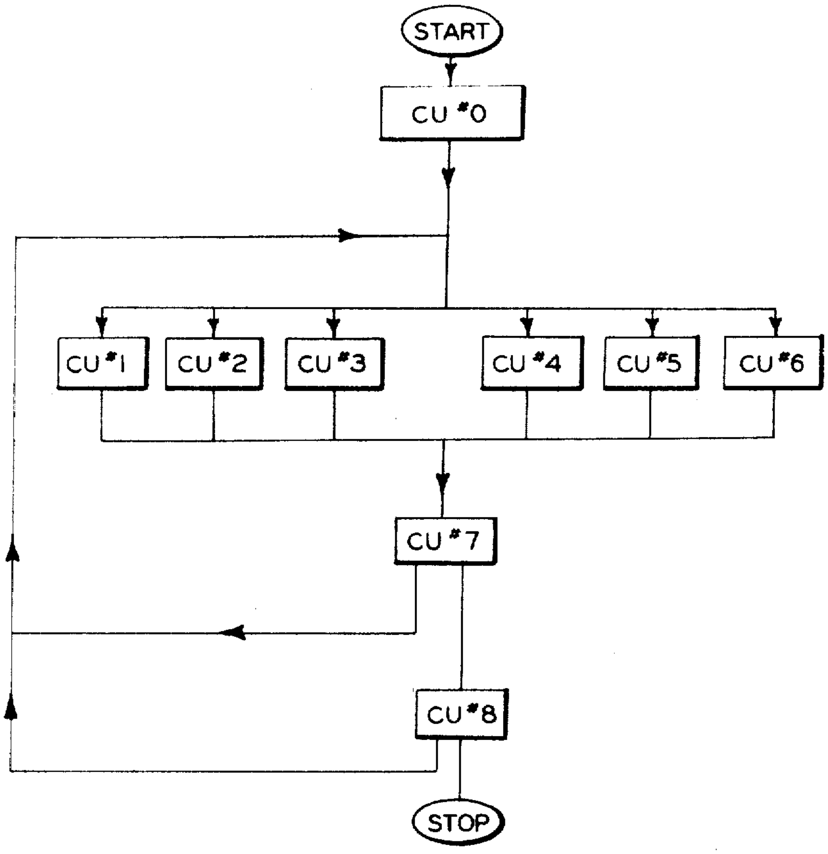

FIG. 2 is a flow diagram useful in understanding the sequence of operation as a typical problem is solved using a multicomputer.

Figure 2A:
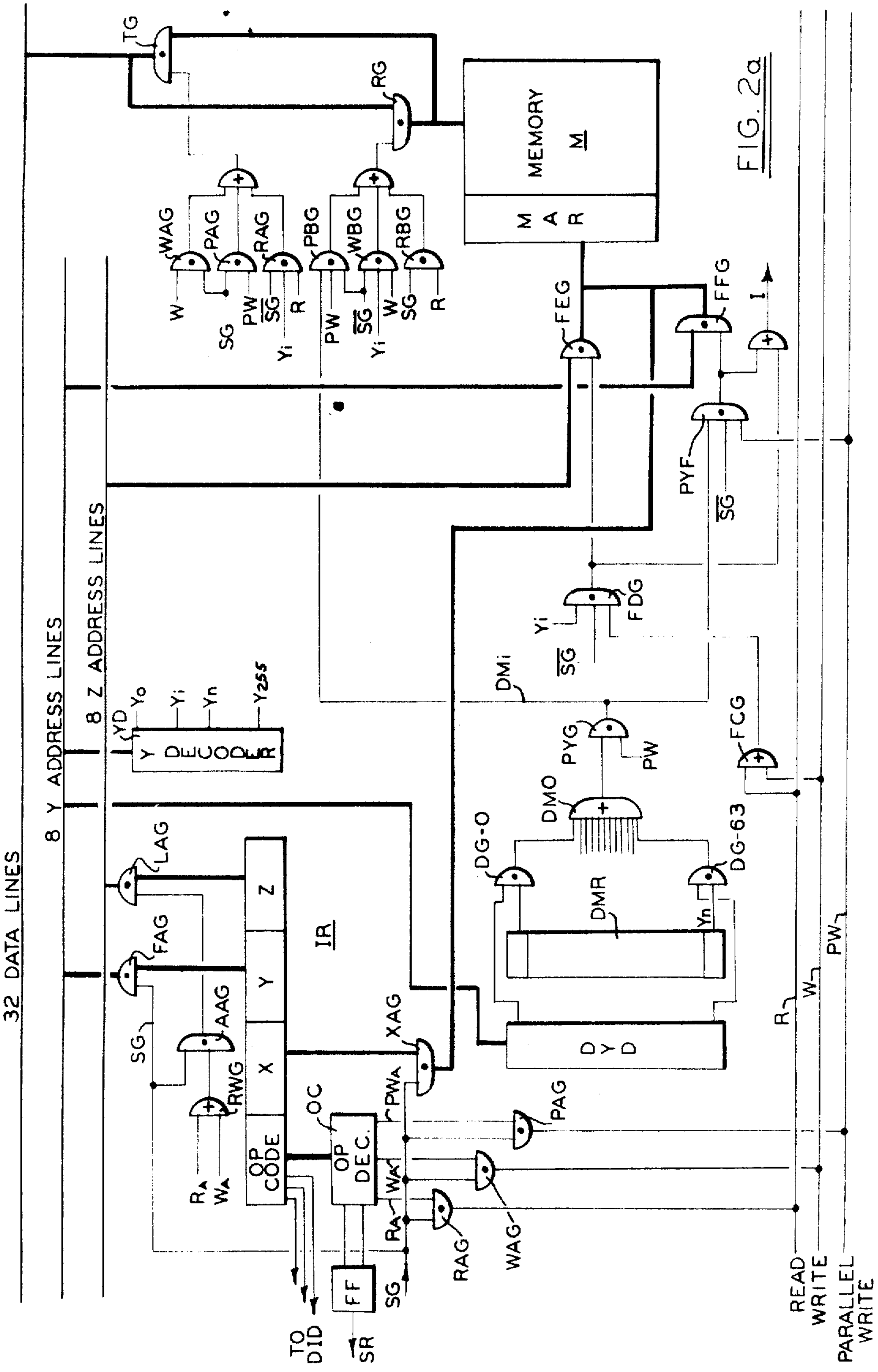

FIG. 2*a* is a schematic diagram, partly in block form, illustrating the manner in which each computer unit may be interconnected to the data interchange network so that data words may be read into a given computer from another computer, or may be written by a given computer directly into specified word locations in the memory (or memories) of one or a plurality of other computers.

Figure 3:
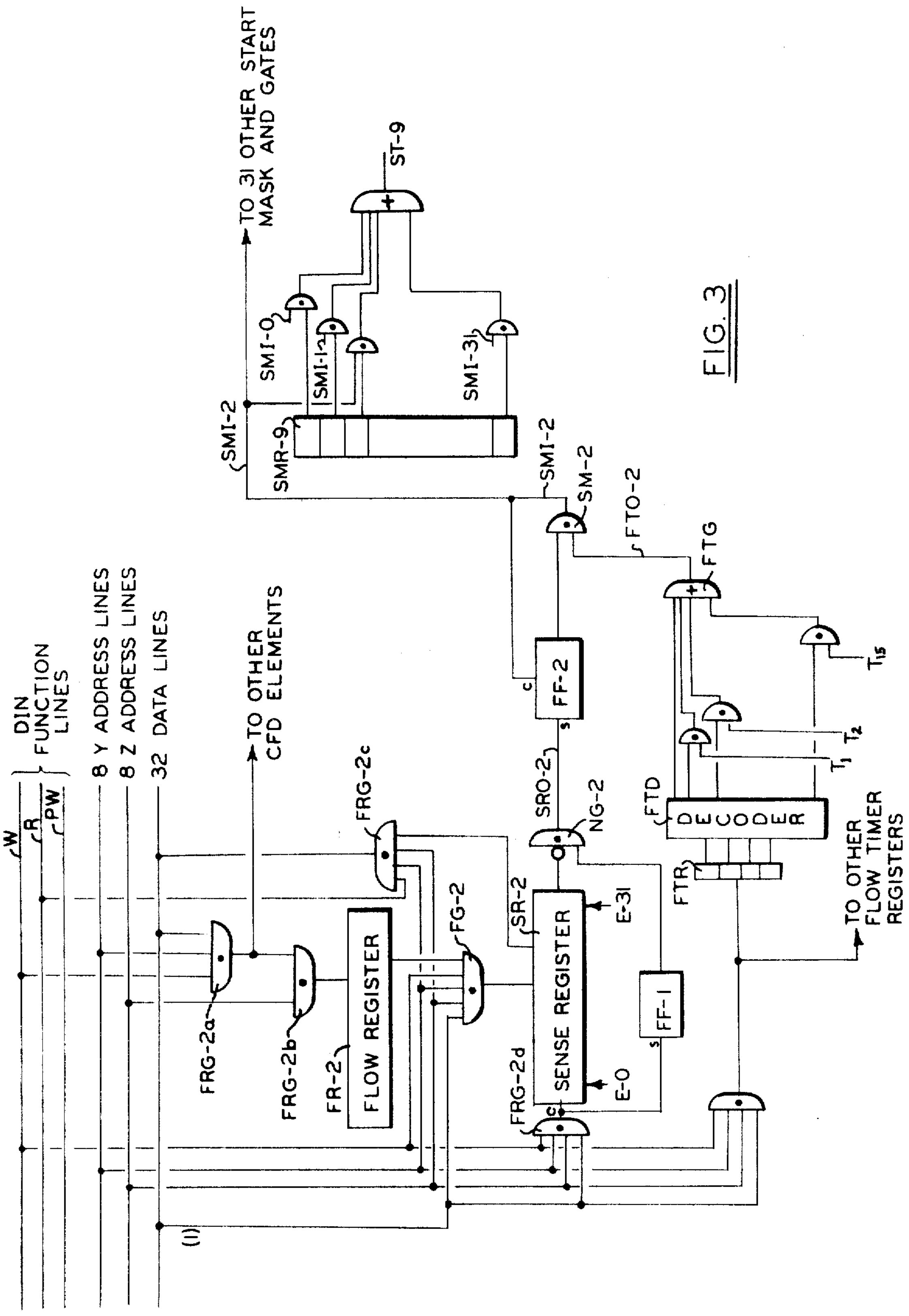

FIG. 3 is a schematic diagram, partly in block form, illustrating a portion of the computation flow director system of FIG. 1 and its interconnection to the computer units of the multicomputer.

Figure 4B:
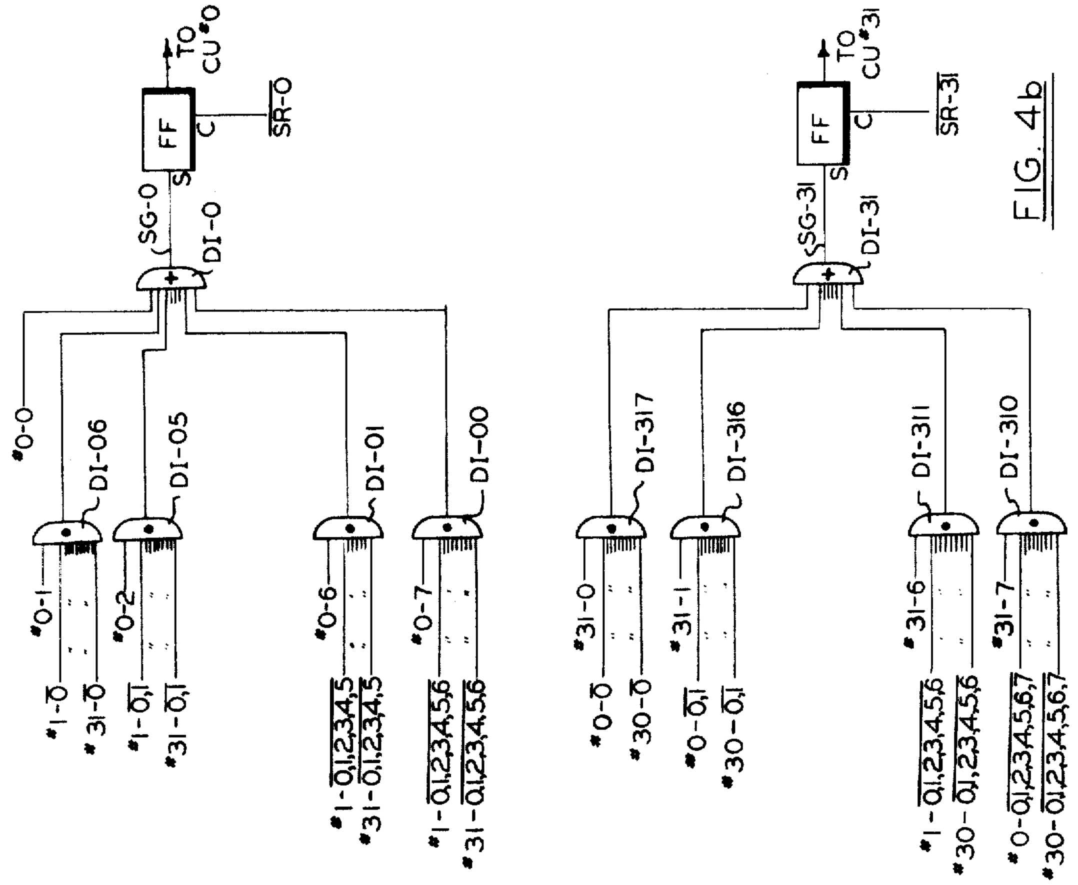
Figure 4A:
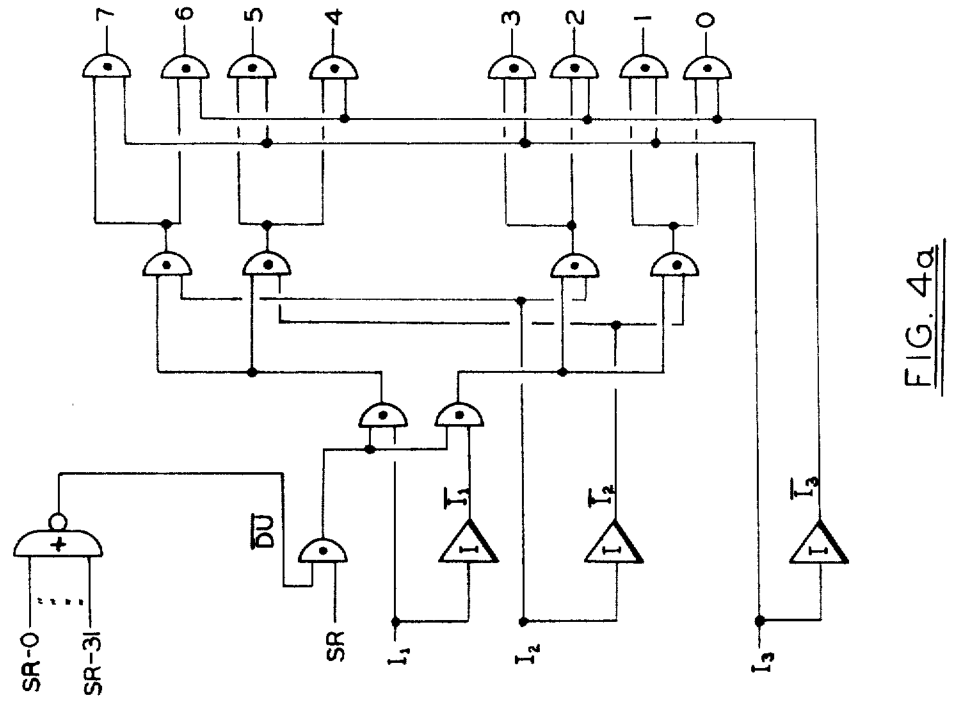

FIGS. 4*a* and 4*b* are schematic diagrams which illustrate the data interchange director unit of FIG. 1.

Figure 5A:
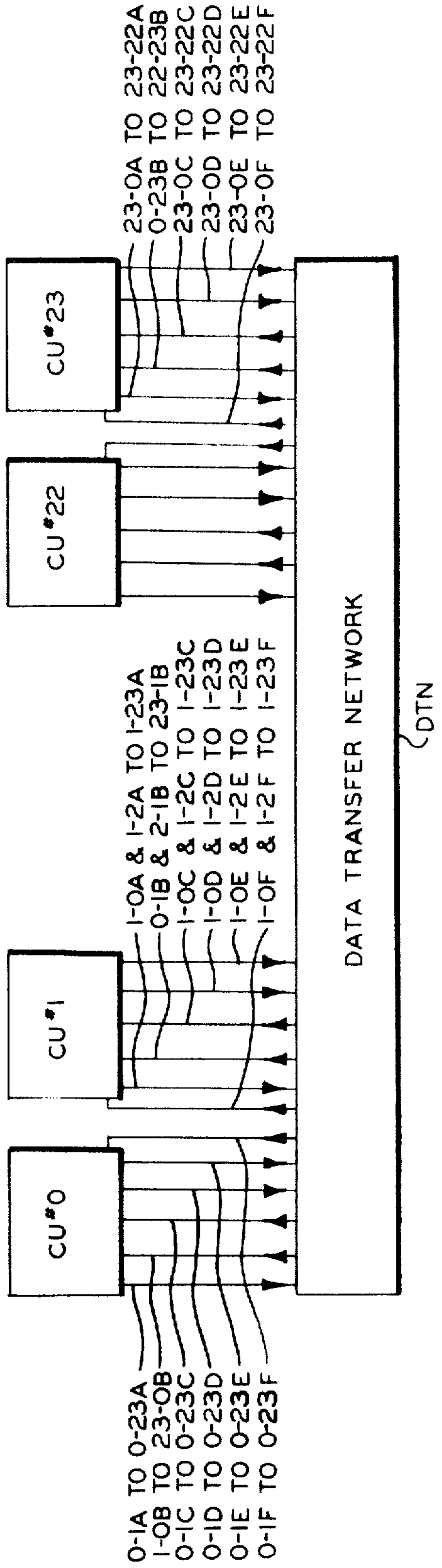

FIG. 5*a* is a block diagram of an alternative form of multicomputer in which a large plurality of computer units are enabled to communicate simultaneously, using serial data transmission, with another large plurality of computer units, over a data transfer network.

Figure 5B:
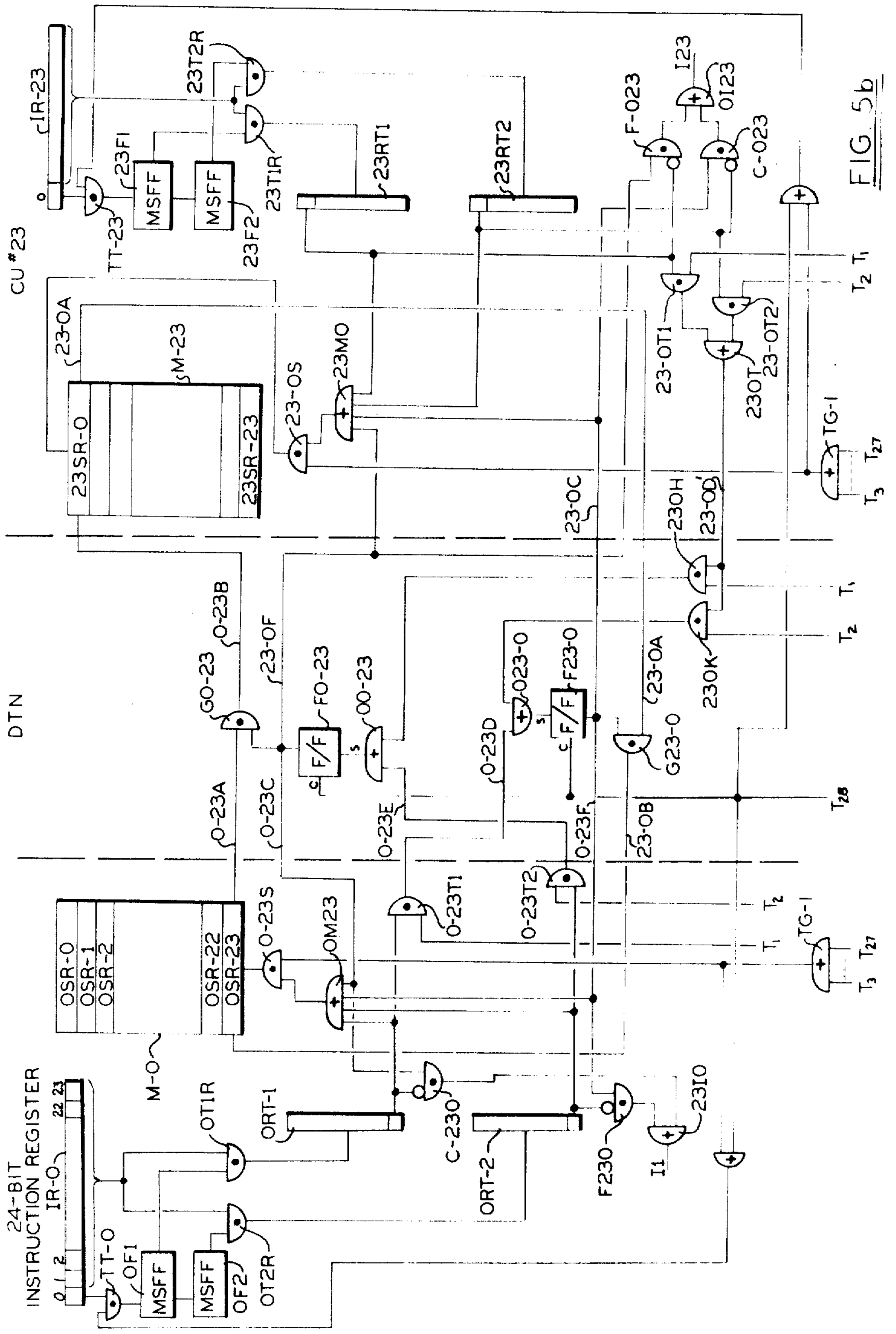

FIG. 5*b* is a schematic diagram illustrating how communication over the data transfer network may be accomplished between a pair of computer units of the multicomputer system of FIG. 5*a*.

Figure 5C:
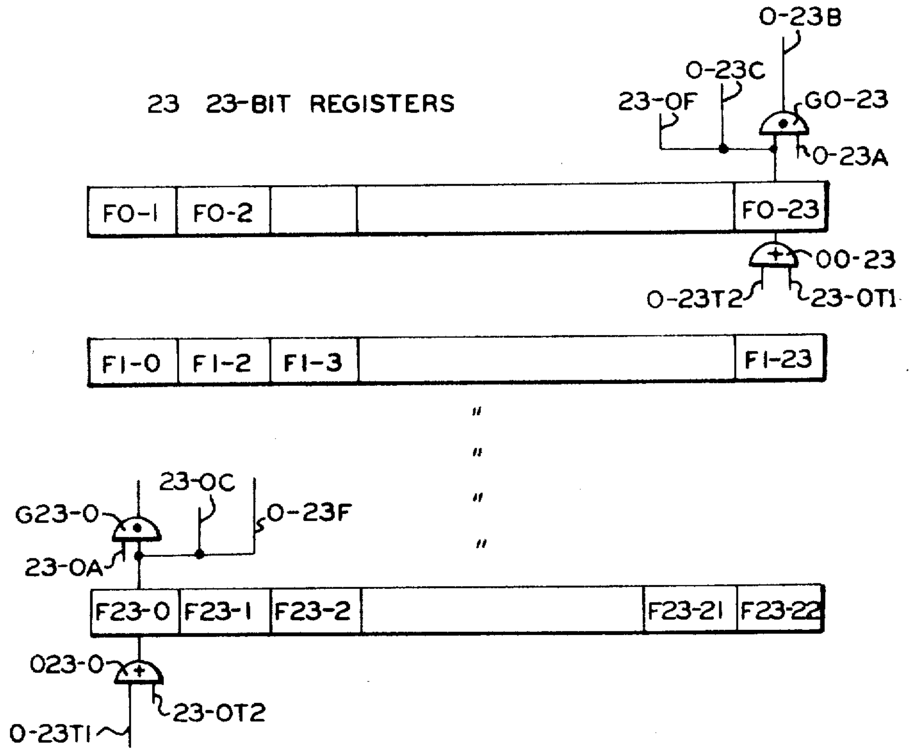

FIG. 5*c* is a schematic diagram illustrating the nature of the data transfer network of the multicomputer system of FIG. 5*a*.

Figure 5D:
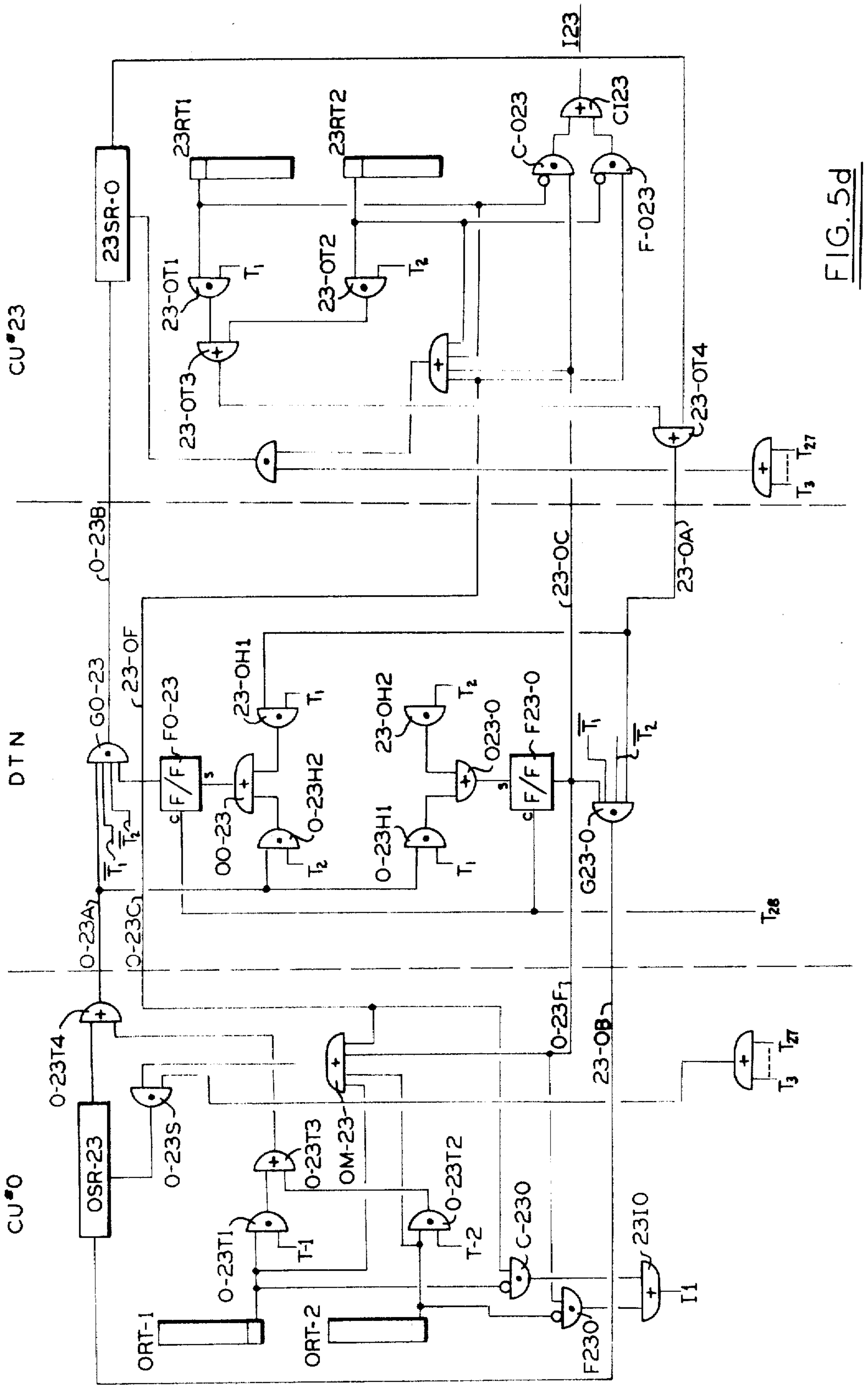

FIG. 5*d* illustrates a modified arrangement which may be used in a system generally of the type shown in FIG. 5*a* to allow communication between computer units with fewer interconnecting wires.

Figure 6:
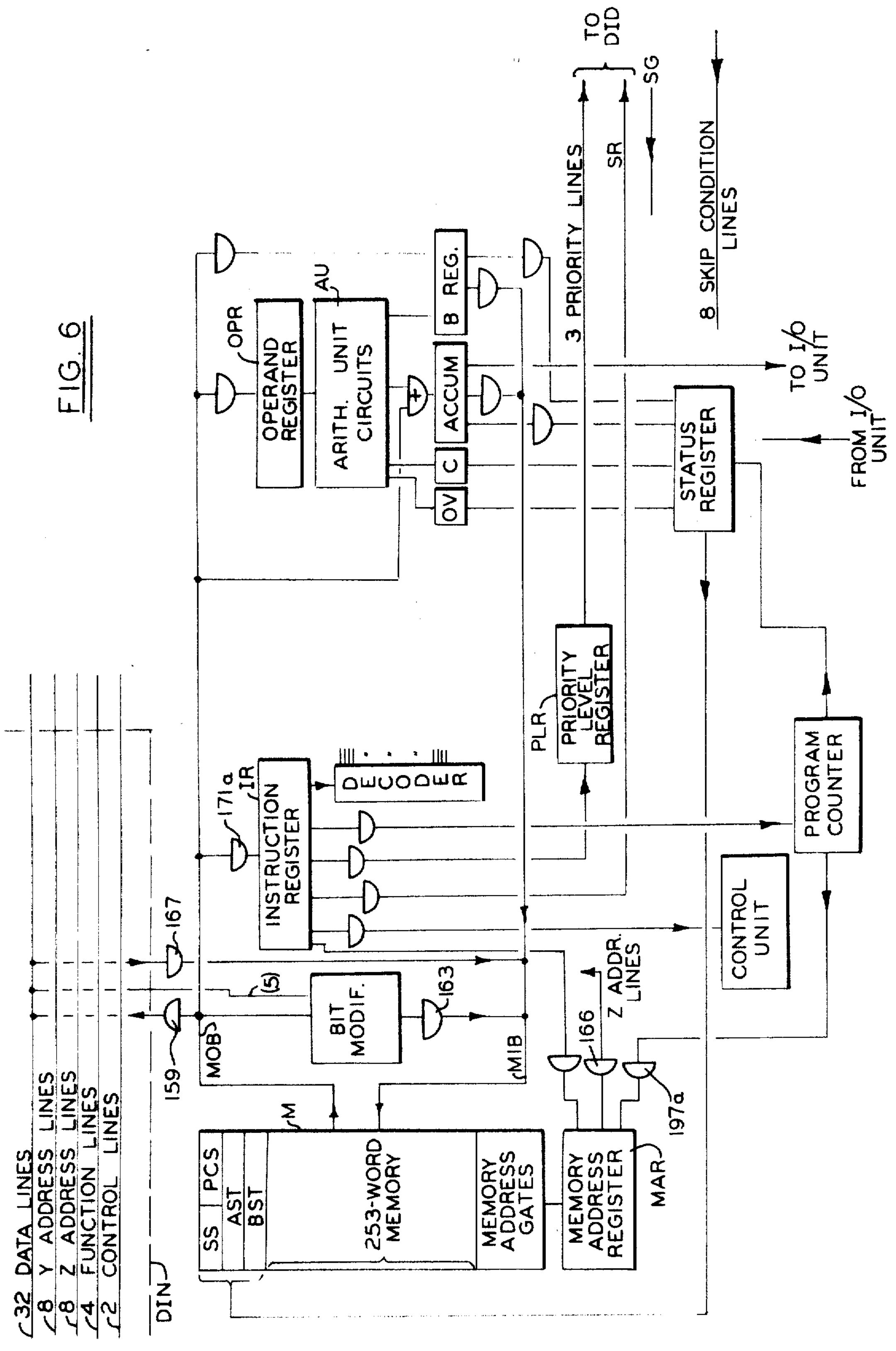

FIG. 6 is a block diagram of one computer unit utilized in a preferred embodiment of multicomputer system.

Figure 6A:
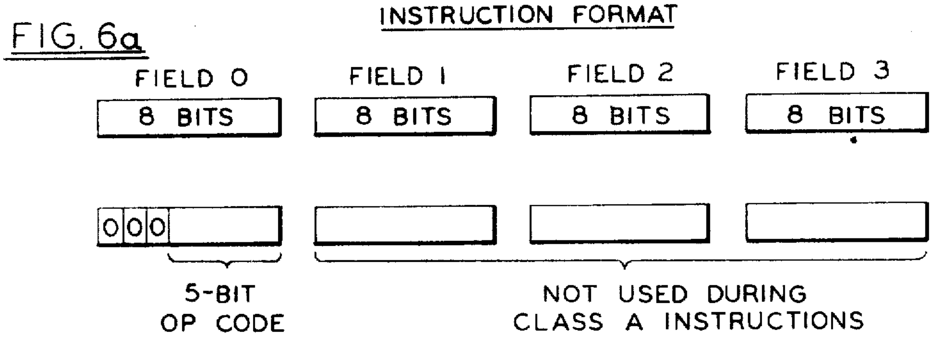
Figure 6B:
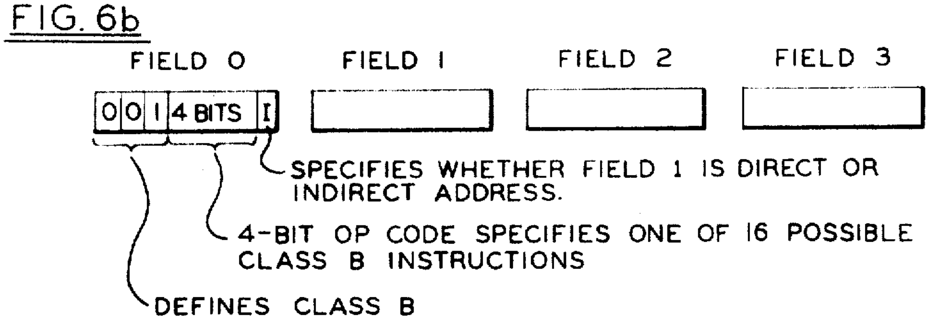
Figure 6C:
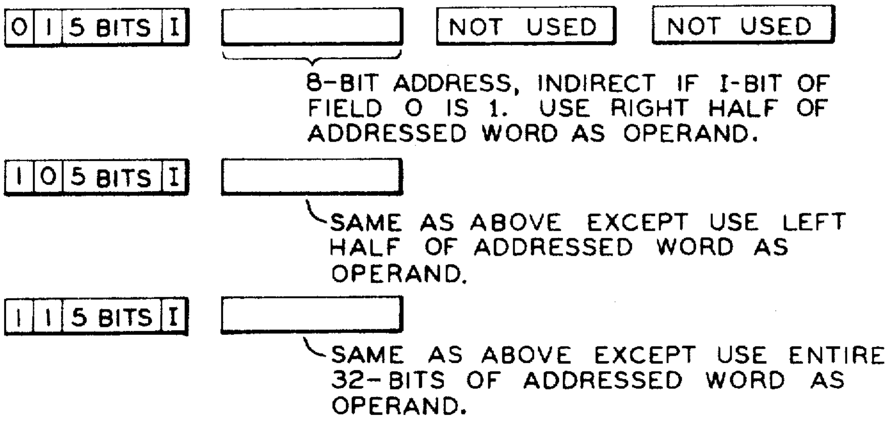

FIGS. 6*a*, 6*b* and 6*c* are diagrams which illustrate an instruction word format which may be used with the computer unit of FIG. 6.

Figure 7:
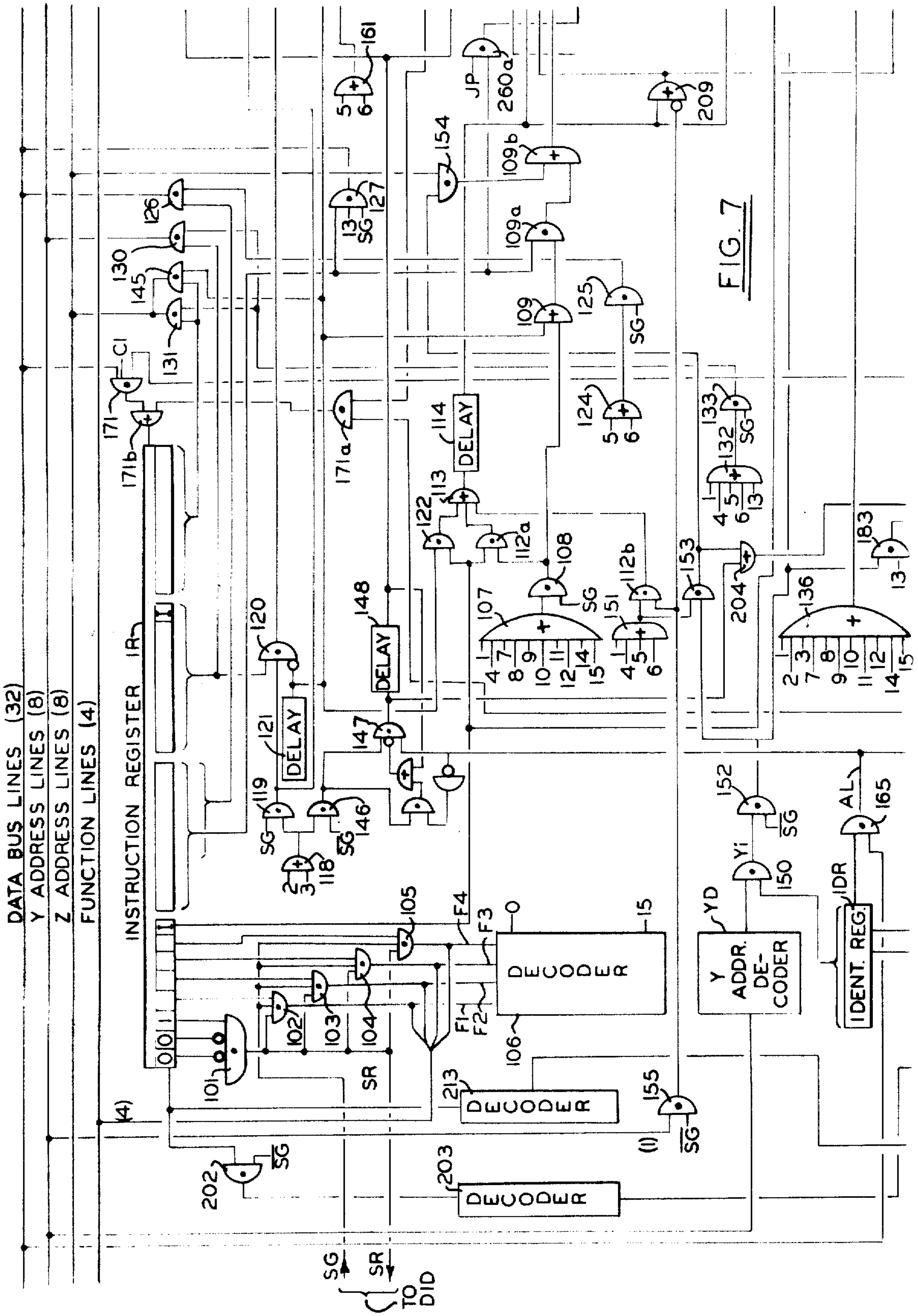
Figure 8:
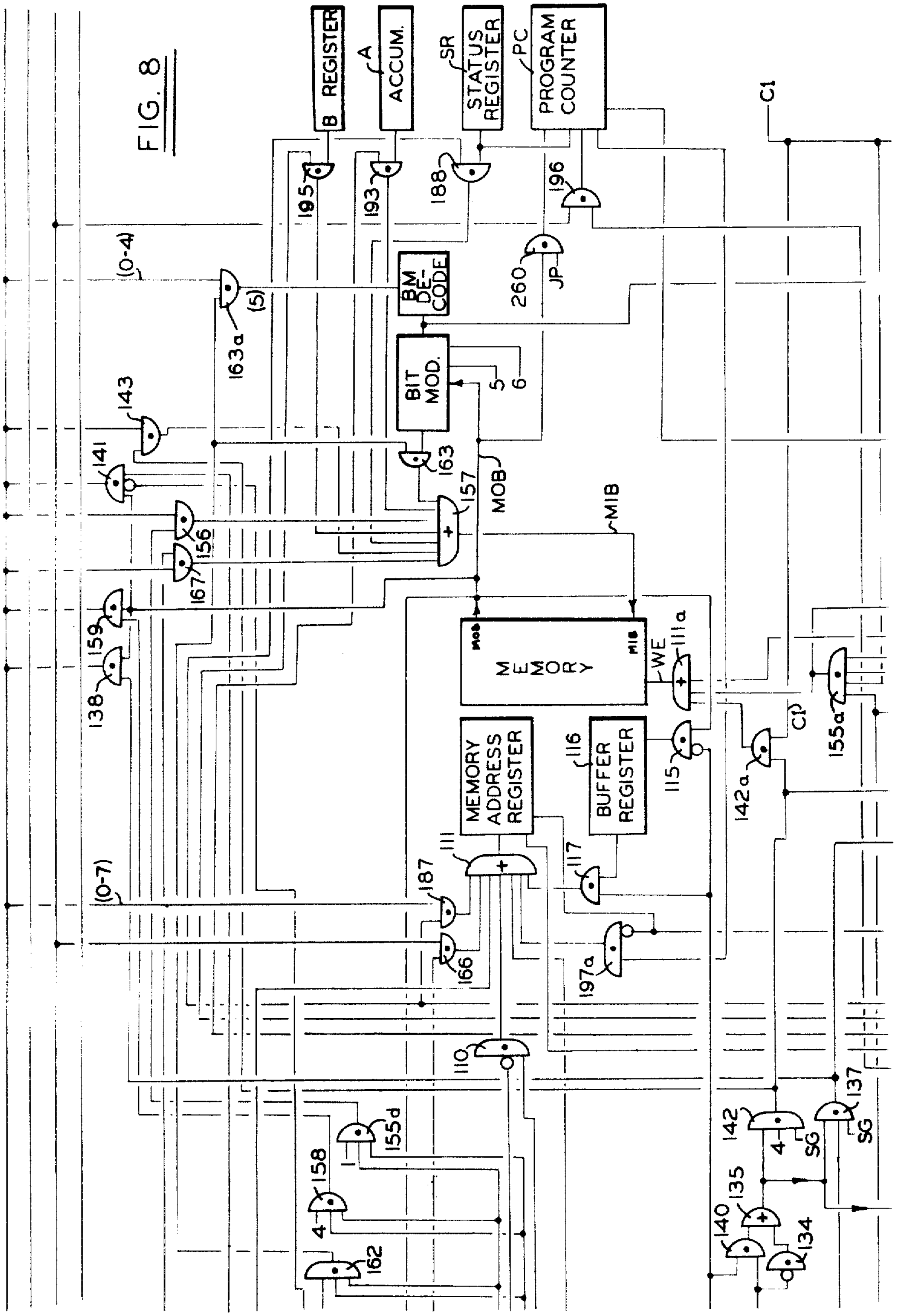
Figure 9:
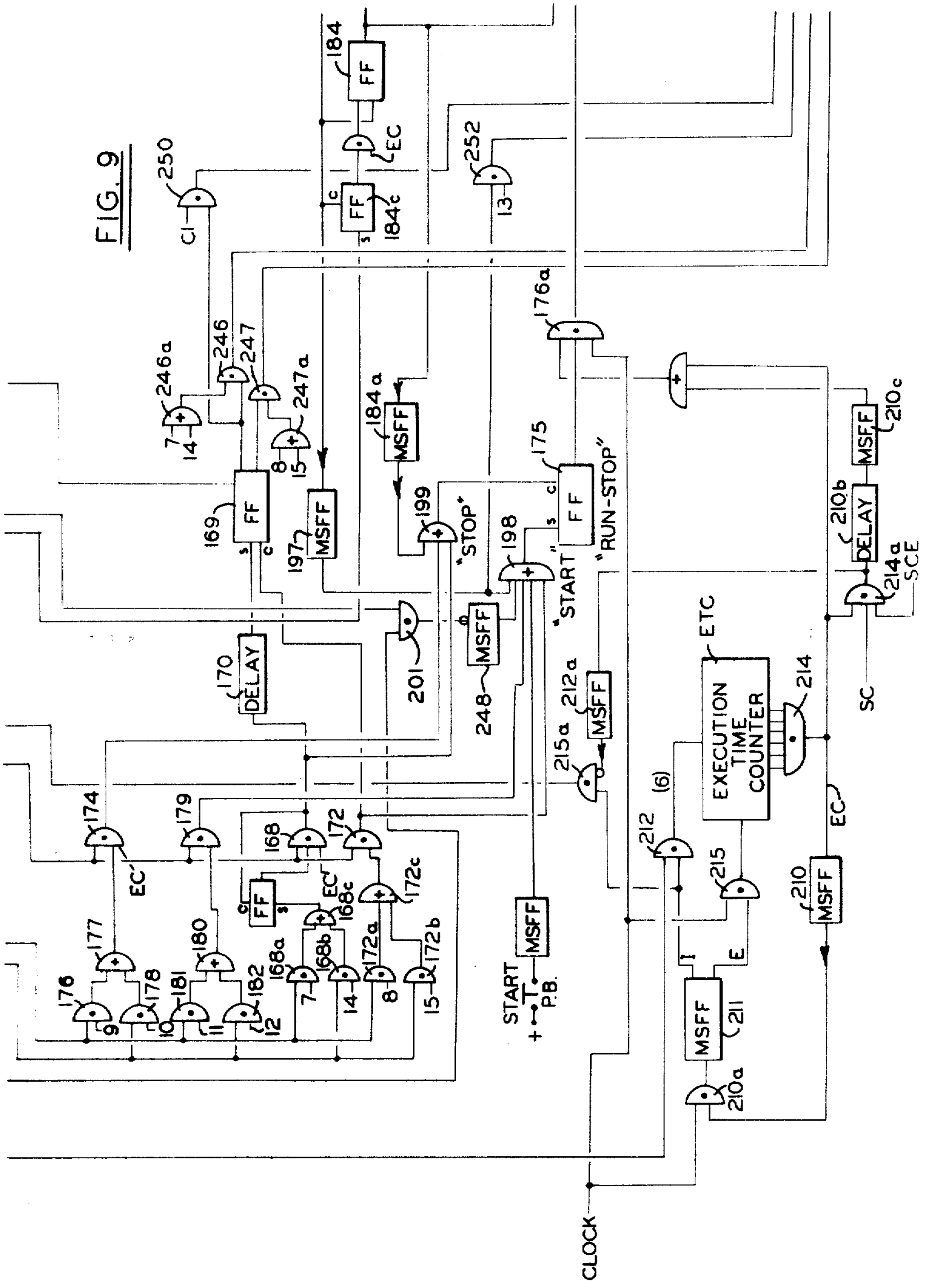
Figure 10:
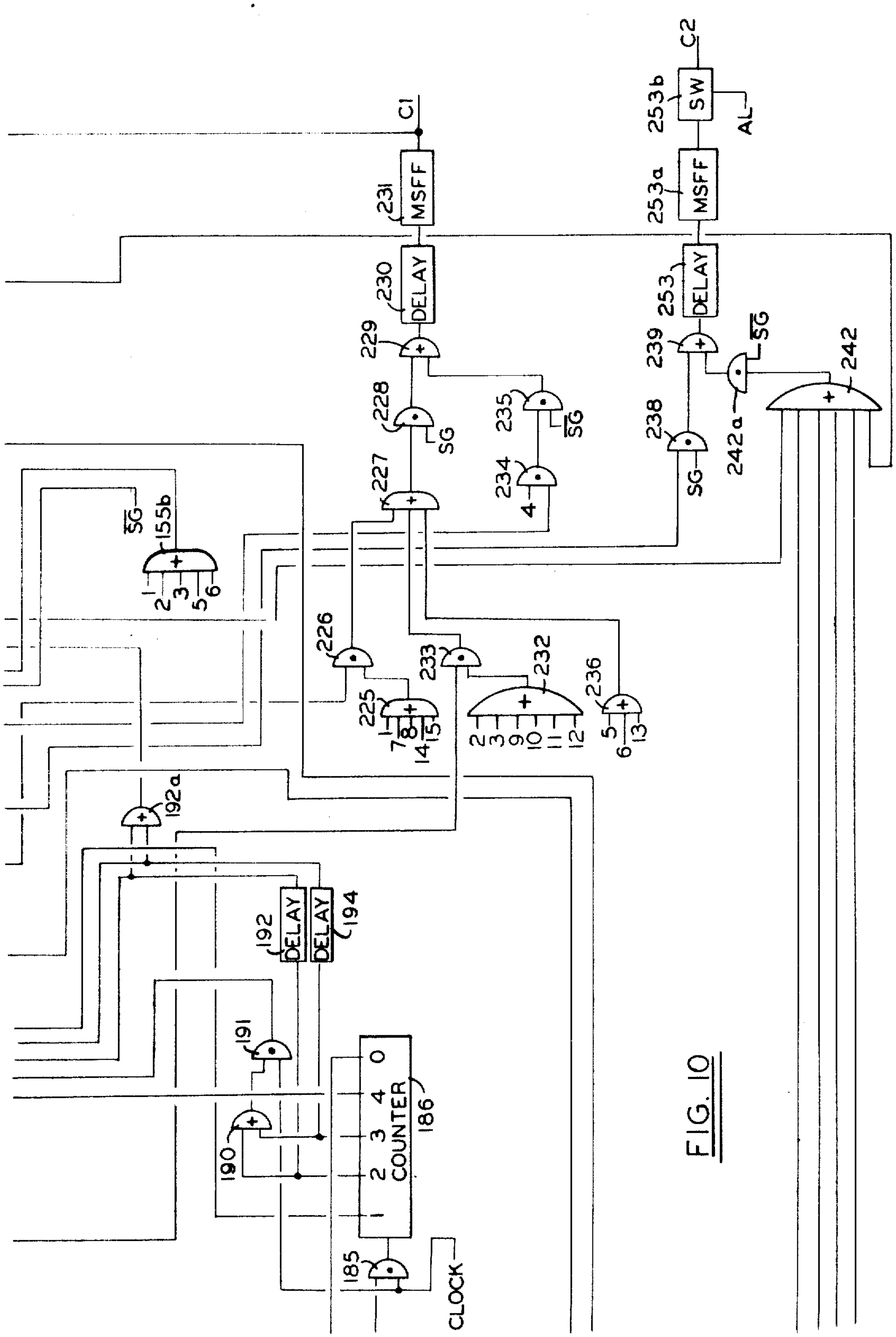

FIGS. 7 through 10 together comprise a schematic diagram of the computer unit of FIG. 6, when arranged adjacent each other with FIGS. 7 and 8 at the upper left and right, and with FIGS. 9 and 10 at the lower left and right.

Figure 11:
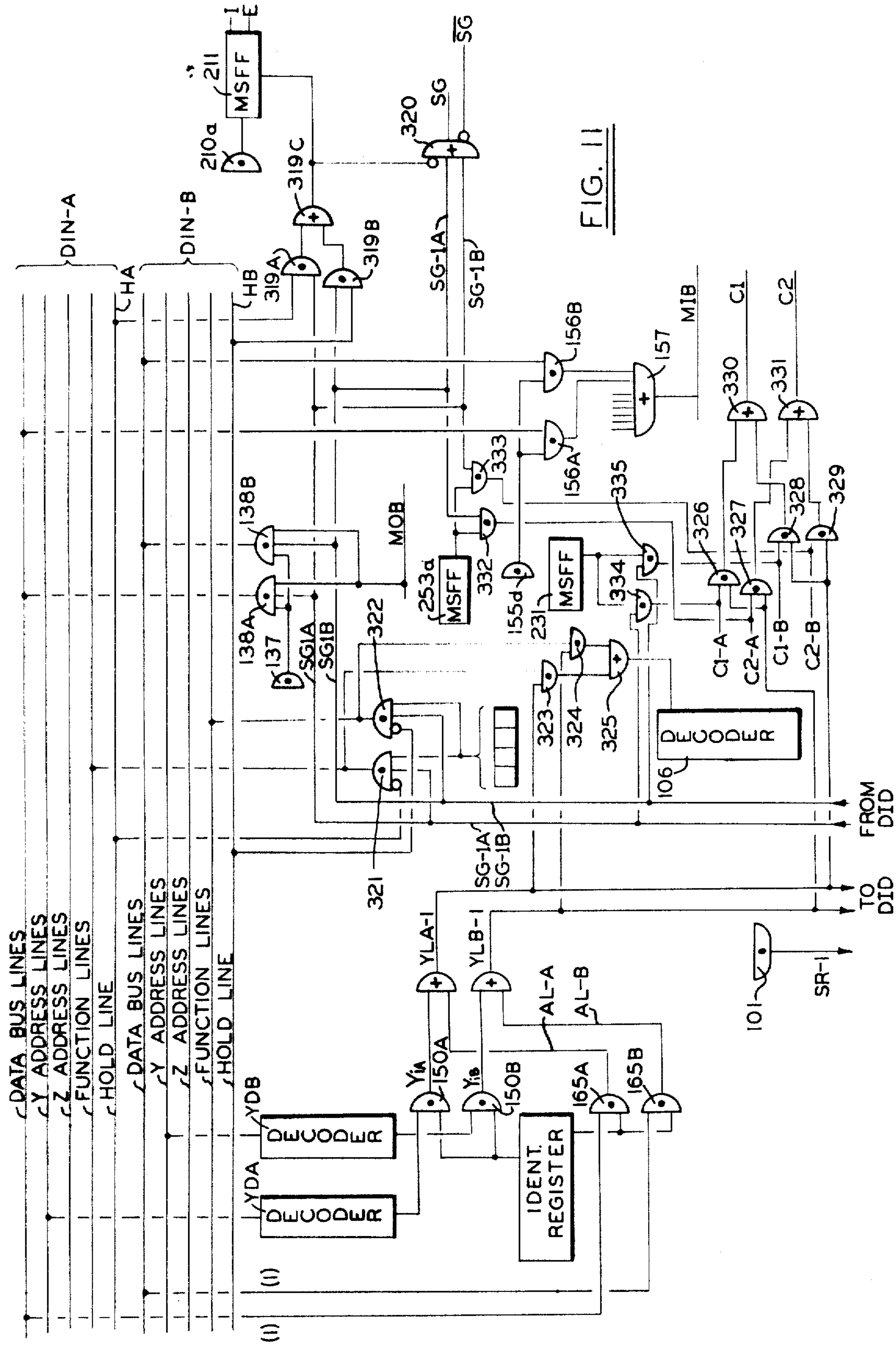

FIG. 11 is a schematic diagram useful in illustrating modifications which may be made to the computer unit of FIGS. 6–10 to allow the use of such computers in a multicomputer system which utilizes two data interchange networks.

Figure 12A:
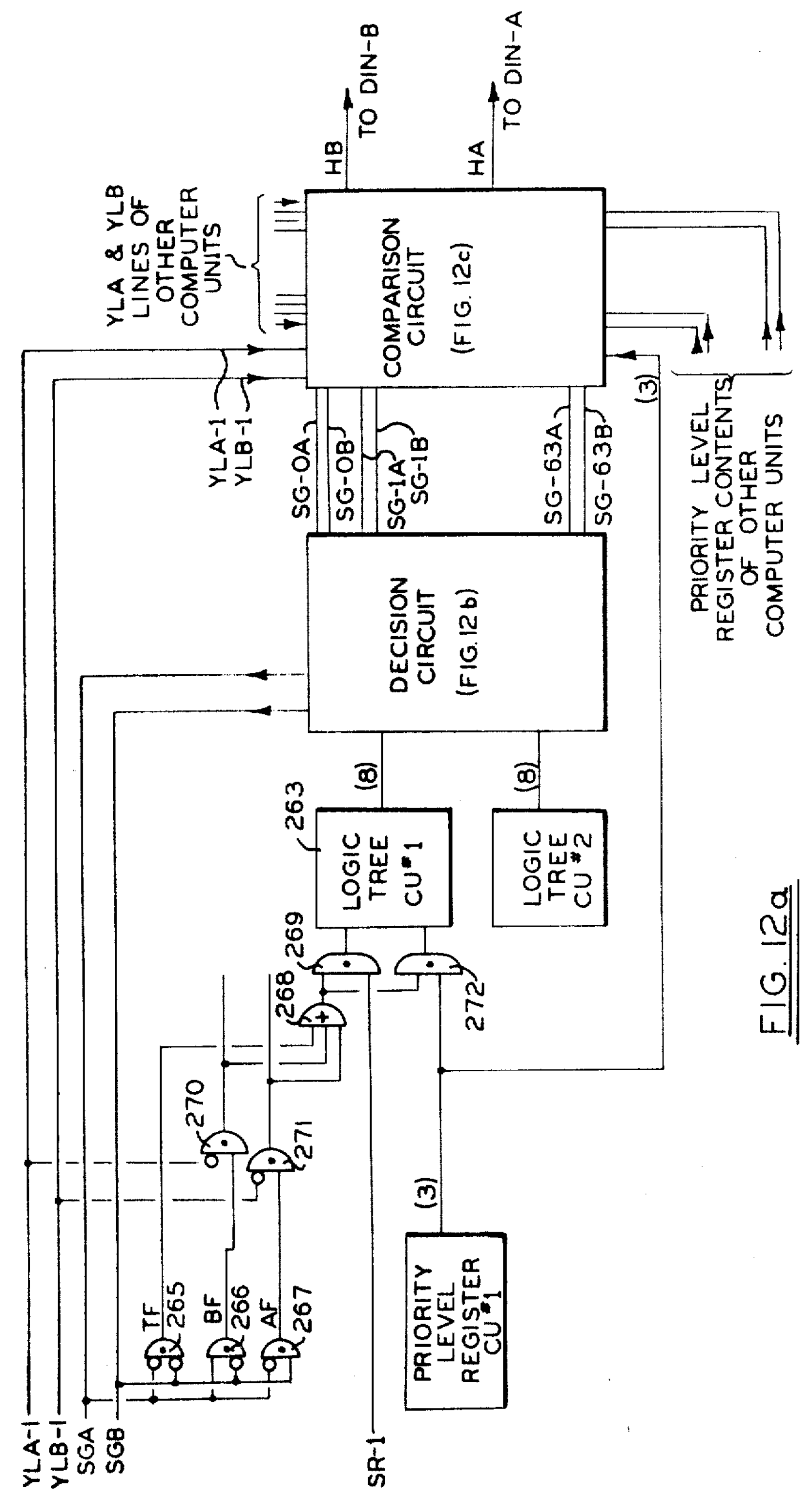
Figure 12B:
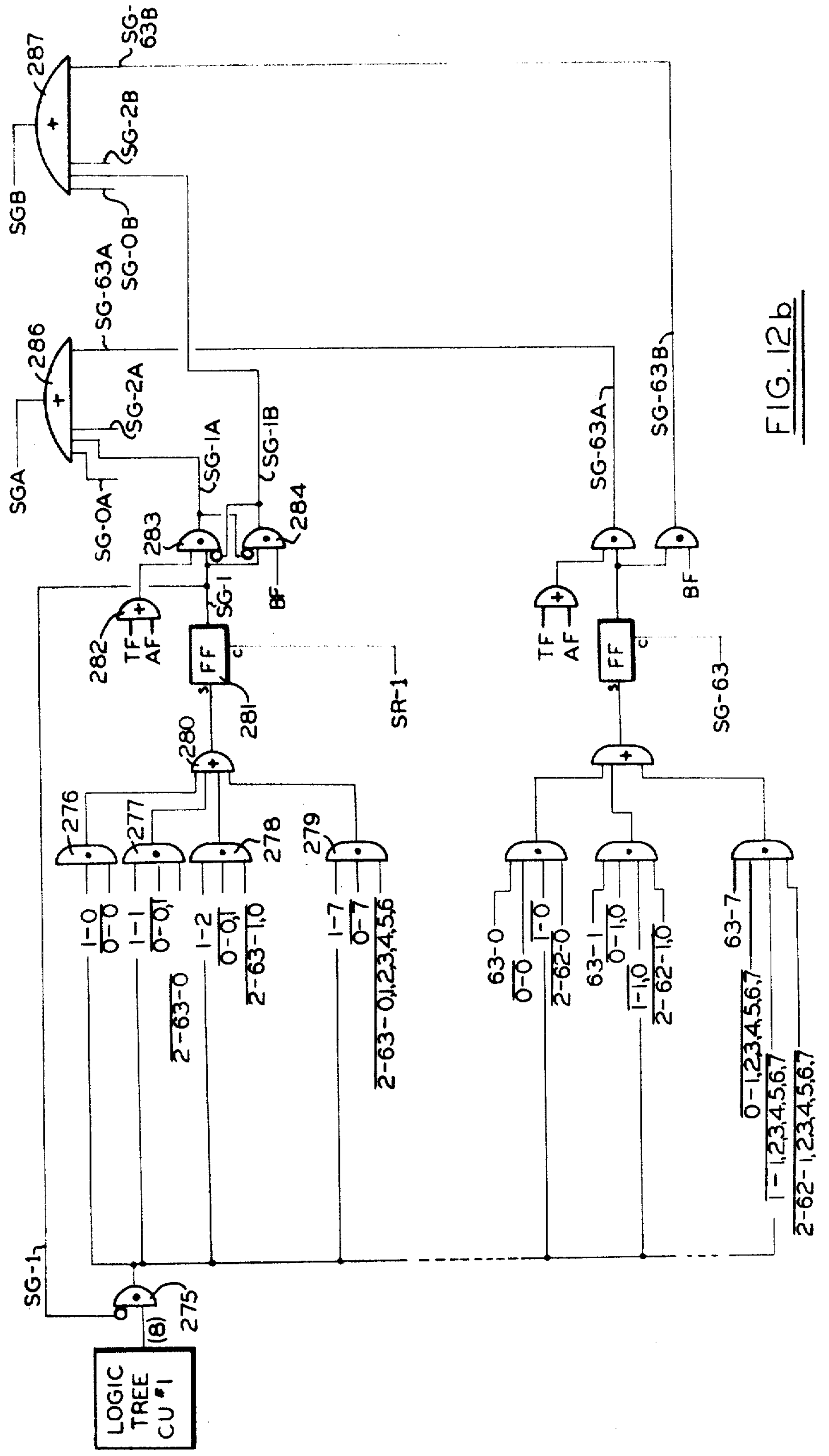
Figure 12C:
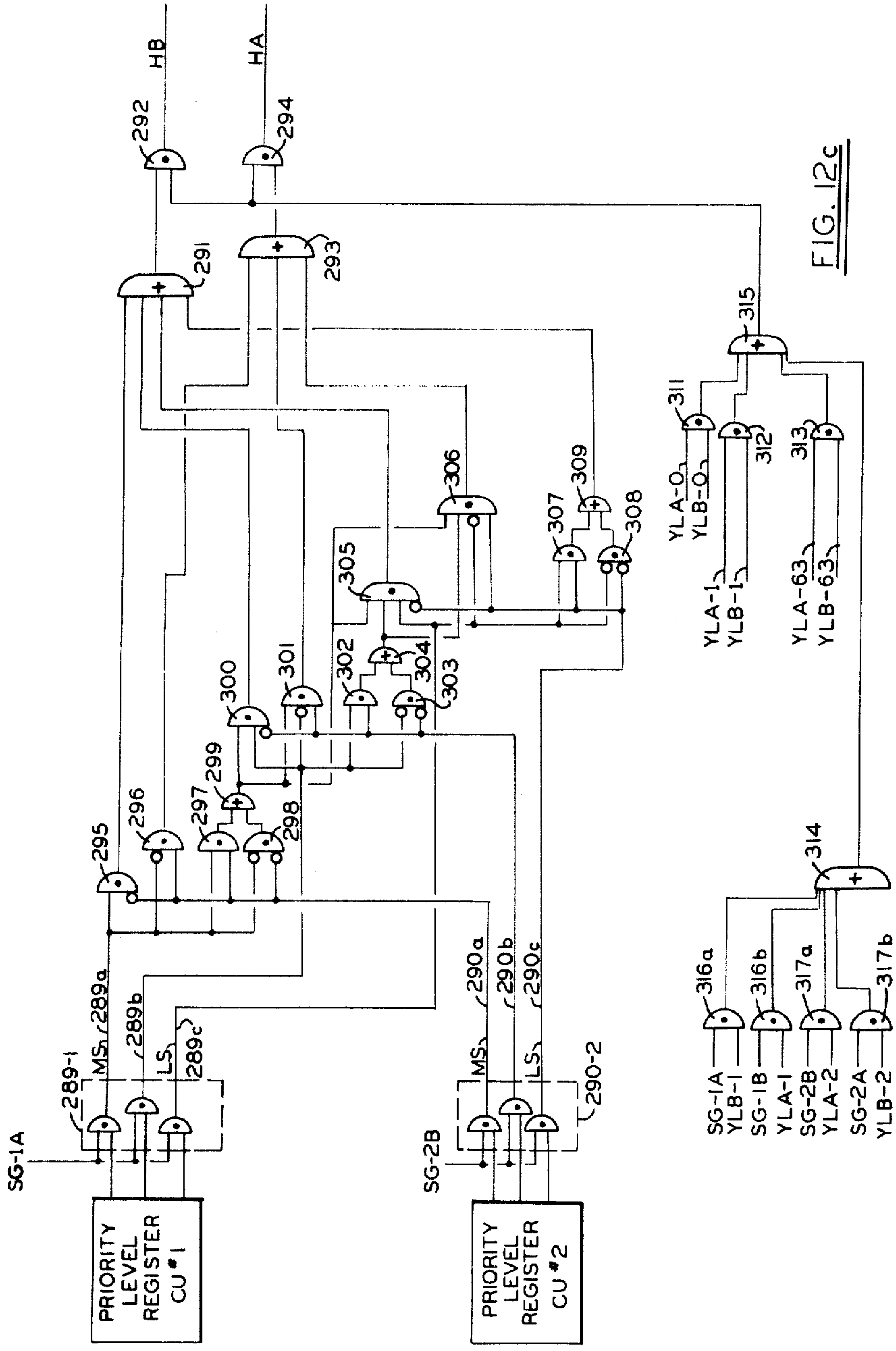

FIGS. 12*a*, 12*b* and 12*c* are schematic diagrams illustrating a form of data interchange director which may be utilized with a multicomputer system having computer units of the type illustarted in FIG. 11.

The illustrative embodiment of the invention shown in FIGS. 1–4 comprises 32 computer units CU # 0 through CU # 31, only four of which are shown in FIG. 1 together with a plurality of peripheral units (DU through ADMU) shown across the top of FIG. 1, a plurality of control units shown across the bottom of FIG. 1, and a data interchange network DIN comprising a 51-wire bus over which the various computers may communicate with each other, with the control units, and with the peripheral units. Though indicated as separate units in FIG. 1, and even though their circuits are connected to be addressable as if they were separate units, the circuits of various of the control units shown across the bottom of FIG. 1 actually are preferably largely distributed physically within the multicomputer so to be located together with the individual computer units. Start mask unit SMU and data mask unit DMU, for example, contain a number of registers which are associated with particular computer units. Each or all of the computer units are also provided with a separate I/O bus (not shown in FIG. 1) over which a given computer may be connected to communicate with one or several of the peripheral units, as by connecting a multiconductor cable between a computer and one of more of such units. Various of the peripheral units also may be connected to data interchange network DIN. The specific embodiment of the invention to be described initially uses an eight-bit unit address code, so that as many as 256 separate units attached to the network DIN may be addressed. Many embodiments of the invention will utilize more or less than 32 computer units, and only one or a few of the peripheral units. A three-decimal-digit number in parentheses associated with each unit in FIG. 1 indicates an illustrative unit address.

The marked increase in computing speed of the present invention as compared to that of a conventional single processor system depends upon a plurality of computer units being able to execute their programs simultaneously. Before proceeding with a detailed description of the multicomputer, it is helpful to an understanding of the operation of the multicomputer to consider in general a typical sequence of operation of the device. FIG. 2 is a flow chart useful in understanding one general sequence of operation of the multicomputer as a typical but somewhat simplified problem is solved. Suppose the problem involves simulation of an aricraft or missile flight, with the intention of optimizing fuel consumption, to determine the manner in which a missile should be guided from one point to another point with minimum fuel consumption, or a minimum fuel consumption for a prescribed time-of-flight. In the solution of such a problem, a first computer unit shown as CU # 0 in FIG. 2 may be used to compute initial conditions and parameters for the missile. Assuming that proper instruction programs have been stored in all of the computers of FIG. 2, and that required initial condition data has been stored in computer CU # 0, the operation of a master start button then starts computer CU # 0 through its program. Computer CU # 0 then computes and applies data words representing initial conditions and parameters to each of computers CU # 1 through CU # 6, each of which might be programmed to solve a respective one of the six differential equations which express translation and rotation of the missile, for example, to derive data words representing translational and rotational velocities.

As soon as computer CU # 0 has completed its program by supplying complete initial condition data to computers CU # 1 to CU # 6, a "halt" instruction in the program of computer CU # 0 provides an "end" signal from computer CU # 0. The end signal from CU #0 is used to provide a "start" signal at time $t_0$ for each of computers CU # 1 through CU # 6. From the initial condition data supplied by computer CU # 0, and from other data stored in their memories, computers CU # 1 to CU # 6 then simultaneously compute the plurality of translational and rotational velocities which the missile will have at time $t_1$. Due to the intercoupling of the forces and moments and velocities along and about the axes of the missile, some or all of the computers CU #1–CU # 6 will communicate with each other and will other then-halted computers, and with external memory units, at various times as they proceed through their respective programs. Various of the computers of the group CU # 1–CU # 6 may take longer to complete their calculations than others of the group, so that various of the six computers will reach halt instructions in their programs at different times. When all six have reached halt instructions, however, in their respective programs, "end" signals will have been generated from all six. As soon as all six have generated an end signal, the combination of the six end signals is used to generate a "start" signal for computer CU # 7.

Computer CU # 7, utilizing data computed by various of computers CU # 1 to CU # 6 and data and instructions stored within its own memory, then integrates the data over a selected simulated time interval from time $t_0$ to time $t_1$, eventually providing a plurality of data words which represnet angular and translational displacements of the missile, such as altitude, for example, at time $t_1$, and a new weight for the missile. A variety of different well-known numerical integration formulas, such as Runge-Kutta, Gill, Adams-Bashforth, Euler, etc., may be used, of course, in different applications. To integrate six velocity quantities from computers CU # 1 through CU # 6, computer CU # 7 would include six successive integration routines in its program prior to a halt instruction. If each integration routine were a lengthy one, one can instead use six computers in lieu of a single computer CU # 7 so as to perform the six velocity-to-displacement integrations parallel in time. As will be seen below, each computer is capable of reading a data word from the memory of another computer, of writing a data word into the emory of another computer, and of "parallel writing" a data word simultaneously in the memories of a selected group of the other computers. With different computers operating at different times and interchaning data between each other, the programmer has considerable latitude of choice in determining which computers should include such data transfer instructions in their programs. In the above example, where CU # 7 begins its computations as soon as CU # 1–CU # 6 stop, using data computed by CU # 1–CU # 6, it will be seen that the data words computed by CU # 1–CU # 6 could be either transferred to CU # 7 by a number of Write instructions near the ends of the CU # 1–CU # 6 programs or instead transferred by a number of Read instructions at the beginning of the CU # 7 program. By judicious selection of which computers the read, write and parallel write instructions are programmed into, the programmer can tend to balance the workload between the computers, so as not to exceed the storage capabilities of a given computer, and so as to appropriately tailor the length of time a given computer takes to execute its program. If CU # 1 were required to perform somewhat more lengthy computations than CU # 2–CU # 6, for example, the latter 5 computers may be programmed to write computed data into CU # 7 (and elsewhere, if necessary) as some of the last steps of their program, but without equivalent steps being included in the CU # 1 program, and with words computed by CU # 1 which are needed by CU # 7 being obtained by read instructions listed early in the CU # 7 program. By such a technique computers CU # 1–CU # 6 all frequently may be arranged to finish their programs at approximately the same time.

Computer CU # 7 may write various computed data words (such as altitude) into the memories of computers CU # 1 through CU # 6, and then halt, or, as suggested above, words computed by CU # 7 may be held in storage in CU # 7 and then extracted from CU # 7 by Read instructions in the CU # 1–CU # 6 programs. The halting of computer CU # 7 provides an end signal which is used to re-start computers CU # 1 to CU # 6, which then proceed again through their respective programs, calculating new velocity data and other data for time $t_2$. When computers CU # 1 to CU # 6 all have provided end signals again, computer CU # 7 is again started through its program, and in executing its program the second time computer CU # 7 provides new displacement and fuel consumption data representing conditions at time $t_2$. Such computation as that described above may be repeated over and over many hundreds of times, out to time $t_n$, with computer CU # 7 being started each time as soon as all of computers CU # 1 to CU # 6 have provided end signals, and with an end signal from computer CU # 7 being used to restart computers CU # 1 to CU # 6. With changing data being processed by computers CU # 1 to CU # 6, during successive runs through their programs, the six computers do not necessarily reach halt instructions in the same order each time.

Comuter CU # 7 may include a counter which counts the number of time intervals over which computer CU #7 performs its integration routine, and after a desired number of such intervals, which represent a limit time-of-flight, computer CU # 7 provides an end signal which starts computer CU # 8. Computer CU # 8, reading various words calculated by computer CU #7 (such as altitude, time-of-flight and fuel consumed), and reading words calculated by various of computers CU #1–CU #6, and processing them in accordance with its own program, calculates missile performance and determines a new value of one or several missile parameters (such as fuel comsumption) which should be varied to improve performance. Computer CU #8 writes the new parameters into computers CU #1 to CU #6 and then halts. The halt of computer CU #8 is used to start computers CU #1–CU #6 all over again on a second simulated flight. After a sufficient number of such simulated flights, the performance computed by CU #8 presumably reaches a maximum or optimum value stored in CU #8, providing a different end signal from computer CU #8 which stops all of the computer units.

In the typical problem described above it will be seen that computers CU #1 to CU #6 are required to be started at various times by end signals emanating at various times from CU #0, CU #7 and CU #8, initially by an end signal from CU #0, thereafter each time CU #7 completes its program until CU #7 has performed a desired number of integration cycles, and thereafter to begin a new simulted flight after each time that CU #8 has computed performance and new parameters to use during the next simulated flight, until the computed performance reaches prescribed standards. The manner in which end signals from various of the computers may be selectively combined so as to start other groups of computers at different times in the solution of a problem, with the grouping of such signals made easily variable, is an important feature of the invention.

Each of the computer units, or "CU's" shown in FIG. 1 comprises a stored-program computer having its own working memory and arithmetic unit. In preferred embodiments of the invention the working memory in each computer unit may be very small compared to the memory of conventional digital computers. In one apparatus to be described each computer unit CU #0 through CU #31 is assumed to include a 256-word integrated circuit memory, capable of storing 256 32-bit words.

A typical one of the computer units is shown generally in FIG. 1*a*. The 256-word memory M comprises 256 32-bit integrated circuit registers, memory addressing gate circuits MAG. and a memory address register MAR. Arithmetic and buffer registers and interconnecting busses are not shown in detail in FIG. 1*a*, wherein only major types of data flow are shown functionally. The control circuit CC of the computer unit includes a program counter PC, and various other control circuits. Upon receipt of a "start" pulse on line ST from start mask unit SMU of the multicomputer, control circuit CC causes the computer unit to execute the instruction specified by the computer program counter. The program counter addresses the first 32-bit instruction word in memory M and non-destructively reads the first instruction word from memory M into instruction register IR.

Each instruction word comprises an 8-bit operation code and three 8-bit addresses in the following format:

| Op code (8-bits) | Address X (8-bits) | Address Y (8-bits) | Address Z (8-bits) |
|---|---|---|---|

The 8-bit operation code portion of the instruction word in register IR is decoded by instruction decoder ID. Some instructions which the computer unit can execute are executed entirely within the computer unit, while others require communication with other computer units. Assume that the first instruction word requires the computer to add the data word located at its memory address #100 to the data word located at its address #101 and to store the sum at its address #102, all within the same computer. During the first execution cycle, the operation code portion of the instruction and the X address of the instruction control memory address gates and other gates to read the word at memory location #100 out on the memory output bus and into an accumulator register within the arithmetic unit, during a following instruction cycle the Y address operates similarly to read word #101 into a further register within the arithmetic unit, during one or several further execution cycles the contents of the two arithmetic unit registers are added, and during a further execution cycle the Z address portion of the instruction routes the sum word to be stored at memory location #102. Upon the completion of the execution of the instruction, the program counter is advanced and during an instruction cycle a farther instruction to be performed is read from the memory into the instruction register. As well as utilizing three-address instructions of the type set forth, the computer of FIG. 1*a* may also include many two-address, single-address, and no-address instructions. Inasmuch as the present invention principally involves external communication of each computer unit with other computer unit, the matter of whether the computers use single or plural address instructions for their internal operations is not important. In the solution of typical problems, many of the computer units frequently will be executing their programs simultaneously, as mentioned above in connection with FIG. 2. During much of the time that a given computer unit is executing its stored program, data will be transferred within the computer, such as back and forth between its memory and its arithmetic unit as in execution of an instruction of the type described above, with the computer neither outputting words to other units nor receiving input words from other units. At varoius times, however, it is required that a given computer unit be able to route data words (and sometimes instruction words) to others of the computer units, and to various of the other addressable units, or to extract such words from other computers or various of the ohter units. While various prior art multi-processor systems allow words from one proccessor to be stored in a common memory and then extracted for use in another processor, the present invention, on the other hand, provides for direct communication between each computer unit and each other computer unit.

Each of the addressable units is enabled to communicate with any one (or more) of the other units through data interchange network DIN, which is shown in FIGS. 1 and 1*a* as a 51-wire bus having 32 data lines, 16 address lines ($Y_0$ to $Y_7$ and $Z_0$ to $Z_7$) and three function lines ($F_1$, $F_2$, $F_3$) all of which are routed to each computer unit, and many of which are routed to various of the other units in a manner to be described below. Each unit which needs to communicate with one or more of the other units at any time is also connected via five lines to the data interchange director unit DID (FIG. 1). The five lines between each such unit and the DID include a "service request" line SR, a "service granted" line SG, and three priority lines which are selectively energized to signify one of eight priority levels when the SR line is energized to request access to the 51-wire bus network DIN. In FIG. 1 the "service request" line from computer unit CU #0 is labelled SR-0, the three priority lines between CU #0 and DID are shown as a single line labelled PL-0, and the "service granted" line from DID to computer CU #0 is labelled SG-0. The counterpart connections between the DID and the other computers are indicated similarly with appropriately numbered suffixes.

The three types of program instructions for which a unit of the type shown in FIG. 1*a* requires use of network DIN are a "read" instruction, by means of which the computer is enabled to read a word stored somewhere in another one of the units, a "write" instruction, by means of which the computer is enabled to transmit and write a word at a desired address in a single one of the other units, and a "parallel write" instruction, by means of which the computer is enabled to write a word simultaneously in a plurality of other addressable units, in general at addresses within the other units which are all the same during the execution of a given instruction. In order to communicate with one or a group of the other units, each unt can "request service" in order to obtain access to the 51-wire bus DIN, by energizing its own SR line and selectively energizing its three-priority lines to indicate the urgency of the request. Only a single unit has access to the data interchange network DIN at a given time in the specific embodiment of FIGS. 1–4. Data interchange director DID services successively the requests received from the various units, in a sequence dependent upon the priority level signals which accompany the various requests.

In order to write a 32-bit data word into another single computer unit Y, computer unit CU #0, for example is programmed with an instruction:

| WRITE (8-bits) | X (8-bits) | Y (8-bits) | Z (8-bits) |
|---|---|---|---|

where the 8-bit operation code specifies "write" with a particular priority level), address X specifies the location of the data word within computer CU #0, Y specifies the addressable unit where the word is to be written, nd Z specifies the address within unit Y where the word is to be written. The use of an eight-bit operation code obviously allows each computer to perform as many as 256 different operations. Eight of the operation code numbers may be specified as "write" codes, one at each of eight different priority levels. In an exemplary instruction list the eight "write" instructions are assigned the octal numbers 070 through 077, 070 being the highest priority and 077 the lowest priority write instructions. During the instruction cycle as computer CU #0 prepares to execute the above instruction, the eight-operation code bits set a flip-flop to provide a logic 1 "service request" signal on the SR line from computer CU #0 to data interchange director DID, (2) provide a three-bit coded signal on the three priority lines from computer CU #0 to director DID, and (3) are decoded to provide a function signal which will be connected to one of the three function lines of the network DIN as soon as access to or control of the network DIN is granted to computer CU #0. In an exemplary instruction list all instructions from 040 up to 077 octal (or 00100 000 to 00 111 111 binary) require use of the data interchange network, and hence merely sensing the third bit of the operation code when an instruction is put in the instruction register of a computer directly indicates whether or not the service request line SR of that computer should be raised, while the last three bits of the operation code directly provide the three-bit priority signal on lines $I_1$, $I_2$ and $I_3$. Decoding of the fourth and fifth bits of the operation code determines which one of the three function lines of network DIN will be raised. As soon as data interchange director DID has serviced any higher priority service requests from other units, and with respect to computers other than CU #0, any service requests of the same priority level from lower numbered computer units, director DID will apply a logic 1 signal on the SG line leading to computer CU #0, thereby allowing access to or control of network DIN to computer CU #0. Upon receipt of the "service granted" signal on its input line SG, computer CU #0 will energize one of the three function lines to indicate a "write" operation, will apply addresses Y and Z from its instruction register to the 16 address lines of the DIN, and will apply the word at its data address X to the 32 data lines of the DIN, and the word will be routed to be stored at address Z within unit Y.

In FIG. 2*a* the 32-line data bus (illustrated by a heavy line) is shown connected to route 32-bit words on the data bus into memory M of one computer unit via an input and gate circuit RG, and out from memory M onto the data bus through output and gate circuit TG, and though shown as a single and gate it will be understood that each such gate circuit may comprise 32 and gates, so that 32-bit data words may be written into and extracted from memory M parallel-by-bit. Memory M is shown provided with a memory address register, which includes conventional memory gating circuits, at MAR.

Assume that the computer of FIG. 2*a* is instructed to write the data word contained in its location X into computer Y at location Z in computer Y. The third bit of the op code (i.e., operation code) in the computer instruction register IR raises line SR to request service from the data interchange director DID (not shown in FIG. 2*a*), and the sixth–eighth bits of the op code are routed to director DID and specify the priority level of the service request. The fourth and fifth bits are decoded by operations decoder OC to energize line $W_A$. When access to the data interchange network is granted to the computer of FIG. 2*a*, the logic 1 signal received on line SG from director DID enables and gate WAG, providing a logic 1 signal on "write" function line W of network DIN. As well as extending to many points shown in FIG. 2*a*, the write function line extends to each of the other computer units, of course, as do the read function line R and the parallel write function line PW. Upon receipt of the service granted signal on line SG, the enabling of and gate circuit XAG applies the X address designating from where the data word in the computer is to be extracted, to the memory address register MAR. The receipt of the SG signal also will be seen to enable gate circuit FAG, thereby connecting the Y address portion of the instruction word to the eight Y-address lines of the netowrk DIN, and and gate circuit LAG will be enalbed (via OR gate RWG and and gate AAG), thereby connecting the Z address from the instruction register to the eight Z-address lines of network DIN, and hence the Y and Z addresses will be routed to all of the addressable units.

Now assume that the circuit of FIG. 2*a* is instead the other computer (identified by address Y) which has not been granted control of network DIN but to which the data word was instructed to be routed. Whenever a computer unit is not controlling the data interchange network, its SG line is low. The Y address received over the eight y-address lines is decoded at the addressed computer unit to energize one output line of its Y decoder YD. Assuming, as suggested above, that the computer unit of FIG. 2*a* is being addressed by another computer unit which is executing a write instruction, the computer unit of FIG. 2*a* will have an $\overline{SG}$ equals logic 1, or low SG signal. The controlling computer unit which has access to the DIN will continue to receive, of course, a high SG signal while it is in control of the DIN. If Y decoder YD of the addressed unit energizes its output line $Y_i$, where *i* is the number of the computer unit shown in FIG. 2*a*, it will be seen that the $\overline{SG}$ and the signal on function line W will cooperate to enable and gate WBG, thereby enabling gate RG and connecting the data word on the data bus into memory M of the addressed computer. The simultaneous enabling of and gate FDG will be seen to enable and gate FEG, thereby connecting the Z address from network DIN to the memory address register MAR of the addressed computer, so that the data word is routed to be stored at memory address Z of the addressed computer Y.

In order to read a 32-bit data word into a given computer, such as CU #0, from another addressable unit Y, computer unit CU #0 is programmed with an instruction: READ X Y Z where the eight-bit operation code specifies "read" (with a particular priority level), address X specifies the location within computer CU #0 at which the word is to be stored, address Y specifies the addressable unit from where the word is to be read, and address Z specifies the address within unit Y from where the word is to be read. Eight different operation code numbers (060 through 067) are also assigned to specify eight different priority levels for "read" operations. During the instruction cycle as computer CU #0 prepares to execute such a "read" instruction, the third bit of the operation code bits sets flip-flop FF to provide a "service request" signal on line SR to the data interchange director DID and to provide a three-bit priority signal to director DID, and the fourth and fifth bits are decoded to provide a function line signal to be used as soon as service is granted. Upon receipt of a "service granted" signal on line SG from DID, computer CU #0 of FIG. 2a energizes the "read" function line R via and gate RAG, applies addresses Y and Z to the 16 address lines of network DIN via gates FAG and LAG, and connects the 32-data lines of DIN to address X within computer CU #0, so that the word read from computer Y will be stored within computer CU #0 at address X.

In FIG. 2*a* decoding by operations decoder OD of the fourth and fifth bits of the read operation code energizes read function line R. The SG and R signals at the controlling computer will be seen to enable its and gates RBG and RG, thereby connecting the data lines of the DIN to the memory input bus of that computer, and application of the X address via gate XAG to the memory address register will route the word to the desired X address within the memory of the controlling computer. At the other computer (identified by address Y) from which the data word is to be extracted, decoding of the Y address provides a $Y_i$ signal. The $Y_i$ signal, together with the $\overline{SG}$ signal at the addressed computer and the R signal on the function line R enable its gate RAG and hence its gate TG, thereby connecting the output lines of the memory of the controlled computer to the 32-line data bus. The read signal (applied via gate FCG), the $\overline{SG}$ signal and the decoded Y address $Y_i$ at the controlled computer will be seen to enable gate FDG, thereby enabling gate FEG so that the Z address on the eight Z-address lines of the network DIN is applied to the memory address register of the controlled computer, and hence the word read from the memory of computer Y will be read from address Z of that memory.

In order to write a 32-bit word into a selected plurality of other addressable units, a computer unit such as CU #0 is programmed with a "parallel write" instruction (again with a coded priority level), but with a modified format:

Parallel Write X Y Z wherein address X specifies the location of the word within computer CU #0 that is to be sent out, but where 6 bits of address Y specify a "data mask bit" associated with gating circuits of several, many or all of the other addressable units. Various or all of the addressable units are associated with 64-bit "data mask" gating registers in which data gating words may be stored. The data mask gating registers associated with all of the computer units are collectively termed the data mask unit DMU, shown as a block in FIG.1. The data mask unit includes a separate 64-bit register for each of the computer units, together with a plurality of gate circuits to be described. The portion of the data mask unit associated with a single computer unit is shown in FIG.2*a* as comprising data mask register DMR, 64 and gates, only the first (DG-0) and last (DG-63) of which are shown, an OR gate circuit DMO, a Y address decoder DYD and an and gate PYG. A single line (illustrated at $DM_i$ in FIG.2*a*) leads from the data mask unit to each respective computer unit.

Assume, for example, that the Y address of a parallel write instuction in computer CU #0 is the decimal number "14". During the instruction cycle as computer CU #0 prepares to execute such an instruction, the eight-operation code bits provide a service request signal on line SR to the DID and provide a three-bit priority level signal to DID, and are decoded to provide a signal to energize "parallel write" function line PW (as soon as access to the DIN is granted). When the SG signal is received from DID, computer CU #0 energizes parallel write function line PW through and gate PAG, connects the word in its location X to the 32-line data bus, and connects a six-bit address Y (assumed to be the numeral 14) to six (0–5) of the 16 address lines of network DIN. Energization of function line PW indicates to each addressable unit that the Y address is not a unit address, as in the case of "read" and "write" operations, but instead a special "data mask bit address". The Y address of "14" is decoded and "anded" with the logic signal in stage 14 of all of the data mask registers associated with all of the computers. Upon the execution of the "parallel write" instruction by a computer such as CU #0, the word at address X within the memory of computer CU #0 will be placed on the 32-line data bus of system DIN. The word will be accepted and stored by all addressable units which then have a logic "1" signal stored in bit place 14 of their respective data mask registers, but rejected and not received by those addressable units then having a logic "0" stored in bit place 14 of their data gating registers. Thus the bit patterns in data mask or data gating registers associated with the various units determine whether a given unit will receive and store the data word when another unit places the word on the 32-line data bus to execute a "parallel write" instruction. Various units may have different words stored in their data gating registers, of course, and the words in any such register may be changed, when desired, as computation proceeds. Each bit place of the data gating registers will be seen to be capable of specifying a different combination of units which should receive a word from a "parallel write" instruction. For example, if the data gating registers of computer units Nos.1,2,3 and 4 have logic 1 signals in their bit place #2, while the data gating registers of units Nos.5, 6, 7 and 8 have logic 1 signals in their bit place #3, a parallel write instruction with a Y address of 2 will write the word in a predetermined address (such as memory location #2) at units 1,2,3 and 4, while a parallel write instruction with a Y address of 3 will instead write the word in a different predetermined address (such as memory location 3) at units 5,6,7 and 8.

In FIG.2*a* a computer unit is shown provided with a 64-bit data mask register DMR, which, as mentioned above,is part of data mask unit DMU of FIG.1. The signal in each bit stage of register DMR is connected to a respective and gate, DG-0 through DG-63, to be anded with the output lines from the Y address decoder DYD contained within the data mask unit. Upon occurrence of a parallel write instruction, the controlling computer raises function line PW via its and gate PAG, connects the X address via gate XAG to control its memory address register, connects the Y address (only six bits of which are used during parallel write instructions) to the Y address lines via gate FAG, and energizes its gate PAG to enable its gate circuit TG to connect its memory to the data bus. The six-bit decoder DYD in the data mask unit of each controlled computer decodes the Y address received over the six Y-address lines and energizes a single one of its 64-output lines. All 64 of the lines are anded with one respective bit of the data mask registers associated with each of the computers, only the data mask unit equipment associated with a single computer being shown in FIG.2*a*. If the addressed data mask bit in register DMR associated with the computer of FIG.2*a* is logic 1, an output signal will be applied via OR gate DMO and and gate PYG to raise line $DM_i$, while a zero in the addressed data mask register bit place will result in line $DM_i$ remaining low. The raising of the $DM_i$ line associated with any controlled computer will be seen to enable gate PBG of that computer, enabling its gate RG to connect the data bus to the data lines of its memory, and enabling its gate PYF, thereby connecting the six-bit Y address on the DIN to the computer memory address register to route the data word to a specified location within the memory locations 0 to 63. It will be apparent that the address where the word is stored in each receiving computer unit during execution of a parallel write instruction may be specified, if desired, by the Z address portion of the instruction, by applying the gate PYF output to gate FEG instead of gate FFG, and by applying the $PW_A$ signal to gate RWG. Also, if desired, one of the unused Y bits may be connected to the Y address lines of network DIN to specify whether such a Z address is a direct or indirect address if memory M is connected to allow indirect addressing.

As mentioned above, the words in the data mask registers of all of the units equipped with such registers may be changed as computation proceeds. The data mask registers of all of the units are considered collectively to comprise a data mask unit and have been assigned the unit address 251. By use of "read" and "write" instructions using a Y address of 251 and a Z address to specify a particular unit, desired 32-bit words may be read from or written into a given data mask register. Two 32-bit words are required to fill a 64-bit data mask register, and hence two 32-bit words may be written successively using two successive Z addresses to fill the 64-bit register associated with each computer. However, rather than loading the data mask registers with words associated with a single computer, the successive words to be loaded into the data mask unit preferably will relate to a given bit place of the registers associated with all of the computers, so that a Y address of 251 and a first Z address determines bit place #1 of the data mask registers of 32 different computers, a second Z address determines bit place #2, etc.

COMPUTATIONAL FLOW DIRECTOR AND START MASK UNITS

An important feature of the invention which greatly increases the speed of the multicomputer is the fact that many of the computer units may be programmed to begin execution of their programs simultaneously, thereby allowing many more operations to be performed in a given length of time than if the operations were performed sequentially, as with a conventional single large-scale processor. In the invention, control of various units so that they begin their operations simultaneously is effected by computational flow director CFD, which comprises a plurality of CFD "elements". In FIG.1 computational flow director CFD is shown connected to be addressable over the data interchange network DIN, and also connected to receive "end" signals from each of the computer units, the "end" signal from computer CU #0 being applied via line E-0 and that from computer CU #31 via line E-31, for example.

Each addressable unit which one may wish to start in synchronism with one or more other units is provided with a multi-bit "start mask register." The various start mask registers are shown in FIG.1 collectively comprising start mask unit SMU. A CFD "element" is provided in the computational flow director CFD for each bit place in the start mask registers. Assume for example, that each addressable unit is provided with a 32-bit start mask register. Then 32 separate CFD elements may be provided, with the output signal from each CFD element being anded with the logic signals in a given bit place of all of the start mask registers. It is in no way necessary that the number of CFD elements correspond with the number of computer units provided. A CFD element is provided for each different group or combination of computer "end" signals one may wish to employ to generate a "start" signal. A bit position is provided in each of the start mask registers for each CFD element. In FIG.1, 32 output lines labelled SMI-0 through SMI-31 from the 32 CFD elements of the computational flow director are shown routed to start mask unit SMU. Assume that the output signal from CFD element #6 is separately anded with the logic signal in bit place #6 of all of the start mask registers. If bit place 6 of the start mask registers functionally associated with computer units CU #0, CU #2, CU #4, CU #6 all contain logic 1 signals, while bit place 6 of the start mask registers associated with computer units CU #1, CU #3, CU #5, CU #7 all contain logic 0 signals, an output signal (applied via line SMI-6, not shown in FIG.1) from CFD element #6 to be separately anded with the bit place #6 signals of all of the start mask registers will operate to provide a "start" signal for computer units CU #0, CU #2, CU #4, CU #6, but will not provide a start signal to the other computer units. Thus provision of the start mask registers and associated gating circuits allows a single from a single CFD element to initiate the operation of a selected plurality of units, thereby allowing a "one to a selected plurality" branching in the computational flow sequence. In implementing the flow diagram of FIG.2, for example, a logic 1 signal may be stored in any selected bit place, such as bit place #11, of the start mask registers of computers CU #1 through CU #6 and a logic 0 signal stored in bit place 11 of the start mask registers of all of the other computer units shown in FIG.2. If an "end" signal from computer CU #0 is arranged to apply a start mask input signal from CFD element #11 to the AND gates associated with bit place #11 of all of the start mask registers, occurrence of the end signal from computer 1 will cause computers CU #1 through CU #6 to start as required. Various other CFD elements may be arranged to provide start signals when other computer units or combinations of computer units have provided "end" signals. In FIG.1 the "start" signals from the start mask unit are shown applied to the 32 individual computer units via 32 lines ST-0 through ST-31.

Each CFD element, as will be shown below in detail, is arranged to provide an output signal only when one or a selected plurality of other events have occurred, such as only when a selected plurality of units have emitted "end" signals signifying that they have reached "halt" instructions in their programs, thereby allowing a "selected plurality to one" branch in the computational flow sequence. Each of the CFD elements may be arranged to provide an output signal upon the occurrence of halt instructions in a different combination of computer units. For example, CFD element #3 may be arranged to provide an output signal when "end" signals have been received from computer units CU #0, CU #5, CU #13 and CU #17, while CFD element #4 may be arranged to provide an output signal when "end" signals have been received from a different group of units, such as units Nos. CU #0, CU #6, CU #14 and CU #10, for example. In implementing the flow diagram of FIG.2, a given CFD element may be arranged to provide a "start" signal to computer CU #7 only after "end" signals have been received from all of computer units CU #1 through CU #6. As well as requiring end signals from a selected combination of units, each CFD element also may be programmed to require a particular clock or timing pulse, so that the "start" signal generated by each CFD element will be synchronized with a particular clock pulse, if desired, as well as occurring only after a selected combination of computer units have reached "halt" instructions in their programs.

In a variety of problems to be solved, the various combinations of end signals which cause the different CFD elements to provide a "start" signal desirably will be arranged to vary as computation proceeds, and accordingly, the combination of "end" signals which provides an output from a given CFD element desirably may be required to change as computation proceeds. Therefore, provision is made for changes in operation of the CFD elements as computation proceeds.

As shown in FIG.1 computation flow director CFD, which comprises the plurality of CFD elements, has been assigned a unit (Y)address 253. Each CFD element is assigned a Z sub-address within the CFD unit address, so that 32-bit words may be directed over the 32-line data bus of the DIN network to and from a given CFD element within the CFD unit. Since an eight-bit Z address is used, it would be possible to include almost as many as 256 CFD elements in the computation flow director. (Several Z addresses are used for control of all of the CFD elements rather than to specify individual CFD elements, as will be explained below.) The exemplary embodiment of multicomputer is assumed to have 32 CFD elements within computation flow director CFD. A block diagram of a single CFD element is shown in FIG.3, and it is assumed to be CFD element #2. The element is shown as including a 32-bit flow register FR-2 connected by 32 and gates (indicated as a single gate FG-2) to a 32 -bit sense register SR-2. Each bit place of the sense register is connected to receive end signals from a respective one of the computer units, and receipt of an end signal operates to clear a bit of the sense register to zero. Thus when computer unit CU #0 reaches a halt instruction in its program, it produces an end signal E-0 which will clear bit place #0 in the sense registers of all of the CFD elements. (That bit place may already have a zero in various or all of the sense registers, of course, in which case it will remain cleared.) The total contents of each sense register are applied to a respective NOR gate, such as NG-2, which provides a logic 1 signal on its output line SRO-2 when and only when all of the bits of the associated sense register are cleared to zero. The output signal on line SRO-2 is used to set flip-flop FF-2, and the flip-flop output is anded with a timing signal in gate SM-2 to provide an output signal on line SMI-2 from CFD element #2. The SMI signal from each CFD element is routed to the start mask unit SMU to be anded separately with a respective bit in each of the start mask registers. Emanating from CFD element # 2, the SMI-2 signal is separately anded with bit #2 in all of the start mask registers. In FIG.3 only a single start mask register SMR-9 is shown, and it is assumed to be that associated with computer unit CU #9. The SMI signals from other CFD elements (not shown) are similarly anded with the other bits of register SMR-9, and with the other bits of the other start mask registers.

As soon as all of the computers associated with logic 1 bits in the SR-2 sense register have reached halt instructions and have provided end signals to sense register SR-2, gate NG-2 will raise line SRO-2 in FIG.3, and when line FTO-2 is also raised an output signal will be applied via line SMI-2 to be anded with bit place #2 of all of the start mask registers. The contents of a four-bit flow timer register FTR are decoded by flow timer decoder FTD. One output line from the decoder is connected directly to OR gate FTG, while the other fifteen lines are each anded with a different timing pulse of the multicomputer timing system. If the word in the flow timer register is 0000, the direct input to OR gate FTG raises line FTO-2, so that line SMI-2 will rise as soon as the last of the required set of end signals clears the last logic 1 from sense register SR-2. With different words stored in register FTR, it will be seen that line SMI-2 will rise in synchronism with the occurrence of a selected timing pulse. The rise of line SMI-2 is applied to reset flip-flop FF-2, with a short delay.

The four-bit flow timer registers associated with all of the CFD elements, collectively comprise the synchronizing unit SU (FIG.1), and by addressing that unit (with a Y address shown as 250) the contents of the flow timer registers may be changed, even while computation proceeds. Since each flow timer register holds only four bits, a group of as many as eight such registers may be updated with a single write instruction. The contents of these registers may be changed automatically while computation proceeds, such as where the time scale is changed during a problem run.

By addressing the CFD unit with a unit address Y=253 and addressing a given CFD element with a Z address between 0 and 31, a 32-bit word may be written over the data interchange network DIN into the flow register of the given CFD element or read from the sense register of the given CFD element. In FIG.3 gate circuit FRG-2*a* is operative upon occurrence of a write signal on function line W and a Y unit address of 253 to connect the 32 data lines of network DIN to gate circuit FRG-2*b*. Upon simultaneous occurrence of a Z address of "2" on the Z address lines, gate FRG-2*b* is enabled and writes the word in flow register FR-2. Occurrence of a read signal on function line R, a unit address of 253 on the Y address lines and a Z address of "3", instead enables gate circuit FRG-2*c* to read out the contents of sense register SR-2 onto the 32 data lines of data interchange network DIN. While 32 of the Z addresses are used to specify specific CFD elements, two other Z addresses (254 and 255) are used for control of groups of CFD elements. When the CFD unit is addressed with Y unit address 253 and a Z address of 255 is applied to the CFD unit, an "enable" or arming signal is applied to the 32 and gates which interconnect the flow and sense registers in each CFD element, thereby transferring the contents of each flow register which has a logic 1 on its associated line of the network DIN data bus, to its associated sense register, but not updating the sense registers of those CFD elements having logic zeros on their associated lines of the network DIN data bus. In FIG.3 the simultaneous occurrence of a Y address of 253, a Z address of 255, a write signal on function line W and a logic 1 bit on data bus line #2, enables gate circuit FG-2. The counterpart gates to FG-2 in other CFD elements will be connected to respective data bus lines other than line #2, of course. Thus while the flow registers of the various CFD elements must be filled at different times, the sense registers of all or selected groups of the CFD elements may be up-dated simultaneously. If desired, different selected groups of CFD elements may be arranged to respond to different Z address signals, so that half of the CFD elements update their sense registers with a Z address of 244, while the other half responds instead with a Z address of say 250. When the CFD unit is addressed with Y address 253 and Z address of 254, a "clearing" signal is applied to the sense register in each CFD element which has a 1 on its associated data line to clear all of the bits of such CFD elements to all zeros, thereby clearing the sense registers of all such CFD elements simultaneously. Those CFD elements having logic zeros on their associated data lines are not cleared. Because there are only 32 data lines, one can update or clear only as many as 32 CFD elements per instruction word. In FIG.3 the simultaneous occurrence of a Y unit address of 252, a Z address of 254, a write function signal W and a logic 1 bit on data bus line #2 enables gate circuit FRG-2d, the output of which clears all of the stages of sense register SR-2 if data bit #2 is logic 1. The output of gate FRG-2*d* temporarily sets monostable flip-flop FF-1 to temporarily inhibit gate NG-2, so that clearing a sense register does not provide a start mask input signal.

DATA INTERCHANGE DIRECTOR

The service request line SR and three priority line $I_1$, $I_2$, $I_3$ from each computer are routed to a respective decoding network in the data interchange director DID, one such network being provided in the DID for each computer unit. In FIG.4*a* the decoding network for one computer is shown as comprising fourteen and gates, and three logic inverters connected in a conventional logic tree having eight output lines. The SR signal applied from each computer unit to its associated logic tree within director DID is anded with a $\overline{DU}$ signal, which becomes high only when none of the computers has control of the data interchange network. Such use of the $\overline{DU}$ signal, the derivation of which will be explained, allows a given computer which has control of the DIN to finish executing an instruction before it loses control of the DIN even if higher level service requests are emitted by other computers, and indeed if a given computer having control of the DIN has a series of successive instructions requiring control of the DIN, that computer is allowed to complete the series before relinquishing control of the DIN, even if higher priority service requests are emitted in the meantime from other computer units.

As will be recalled from FIG.2*a*, a flip-flop connected to the operation decoder of each computer unit is arranged to be set to provide an SR signal whenever that computer reaches an instruction requiring control of the DIN, and arranged to be reset each time a new instruction does not require control of the DIN network. The service request signals from all of the computer units are or'ed together as shown in FIG.4*a*, to provide a $\overline{DU}$ signal only when no computer unit has control of the data interchange network. It may easily be demonstrated that upon the application of an SR signal to the tree network shown, the network will energize a selected one of its eight output lines in accordance with the three-bit priority level signal on lines $I_1$, $I_2$, $I_3$.

The eight decoder lines associated with each computer representing the priority of service requests of each computer are all connected to a logic network to function in a manner which will become clear from a consideration of FIG.4b. Any given computer unit which requests service at a given priority level is provided with a service granted signal as soon as network DIN is not being used by any other computer, so long as there is no service requested simultaneously at a higher priority level by any other computer unit nor at the same priority level by a lower numbered computer unit. The number 0 represents highest priority level and number 7 lower priority level. Circuits for deriving SG signals for computer units CU #0 and CU #31 are shown in FIG. 4*b*. OR gate DI-0 provides a service granted signal on line SG-0 to computer unit CU #0 whenever a logic 1 signal is provided on any one of its input lines. The input labelled #0-0 is connected to line 0 of the priority level decoder associated with computer CU #0, and thus whenever computer CU #0 requests service with a priority level 0, service is granted immediately to computer CU #0 as soon as control of network DIN is relinquished. Computer CU #0 can receive service with a level 1 priority if none of the other computers (CU #1 through CU #31) are then requesting service with a level 0 priority, can receive service with a level 2 priority if none of the other computers are then requesting service with a level 1 or level 0 priority, etc. In FIG.4*b* and gate DI-06 provides a service granted signal (via gate DI-0) when line 1 of the CU #0 priority level decoder is energized if 31 other inputs to gate circuit DI-06 from the line 0 of the decoders associated with computers CU #1 through CU #31 indicate that those 31 other computers are not requesting service at a level 0 priority. Similarly, gate DI-05 is enabled if computer CU #0 requests service at level 2 priority if none of the 31 other computers is then requesting service at a level 0 priority of a level 1 priority, etc. FIG. 4*b* also shows OR gae DI-31 which provides service granted signals to computer CU #31. From the logic signals shown connected to the and gates associated with gate DI-31, it will be seen that computer CU #31, the highest numbered computer, has lower priority than any other computer which requests service at the same priority level. If computer CU #31 requests priority with a highest level (level 0) priority ignal, gate DI-317 will be enabled only if none of the other computers (CU #0 through CU #30) is then requesting service with a level 0 priority. It will be seen however, that a higher priority request from a higher-numbered computer will be processed prior to a lower priority request from a lower-numbered computer. The specific gating circuit illustrated in FIG.4b illustrates it overall function only, of course, and a variety of different circuits may be constructed to perform the equivalent logic functions.

While the multicomputer system of FIGS.1–4*b* is shown utilizing a single data interchange network, it is within the scope of the invention to utilize two (or more) similar data interchange networks, to allow communication between two pairs of computer units simultaneously. The use of two data interchange networks requires slight modifications in each computer unit, and incorporation into the data interchange director of conflict-resolving circuits. The nature of the modifications and additional circuitry required will beome apparent below in connection with FIGS. 11 and 12*a*–12*c*, wherein a multicomputer system utilizing two data interchange networks is shown and described.

AN ALTERNATIVE MULTICOMPUTER

In an alternative form of multicomputer illustrated in FIGS.5*a* through 5*d*, each computer unit preferably transfers words within itself using a serial arithmetic unit, and word transfer between the different computers is done serially by bit. This alternative form of multicomputer allows a large number of computers simultaneously to transmit or receive, or to simultaneously both transmit and receive, words to or from, a large number of other computers, so that, in fact, all computer units can be simultaneously both transmitting a word from each other computer unit and receiving a word from each other computer unit.

FIG.5*a* is a block diagram which assumes a multicomputer having as many as 24 computer units, only four of which are shown, at CU #0, CU #1, CU #22 and CU #23. Each of the computer units connects via 138 lines to data transfer network DTN. In FIG.5*a* the 138 lines from each computer are represented by 6 lines having suffixes A through F, each line representing 23 lines between a computer and the data transfer network. Each "A" output line from each computer connects a predetermined word location in the computer to a oredetermined word location in a respective one of the 23 other computers, through a respective output gate (not shown in FIG.5*a*) contained with data transfer network DTN. Each B input line leading into given computer connects a predetermined word location from another computer into a predetermined location in the given computer, through a respective input gate (not shown in FIG.5*a*). Each "C" input line connects a control signal from the data transfer network to a computer, indicating to that computer that a word is to be read out of it into a specified other computer. Each "F" line connects a control signal from the data transfer network to a computer, indicating to that computer that a word is to be written into it from a specified other computer. Each "D" and each "E" line applies a control signal from a given computer to the data transfer network, specifying whether a word is to be sent to or received from, or words both sent to and received from a specified other computer, by a transfer instruction in the program of the given computer. If desired, a single line can be used for a pair of D and E lines from each computer, reducing the number of lines to each computer from 138 to 115, by the addition of several gates, as will be explained below, and wherein such a connection is shown for computer CU #23 in FIG.5*b*. And in a modified form of multicomputer shown in FIG.5*d*, each "A" line, together with further gating serves the functions of all of the A lines, the D lines and the E lines of FIG.5*a*, so that each computer, connects to the data transfer network via 92 lines. In addition to the mentioned lines, certain clock pulse or timing lines extend from a clock to each of the computer units.

Major principles of the embodiments of FIGS.5*a*–5*d* become evident from a consideration of FIG.5*b*, wherein portions of the first computer CU # 0 and the last computer CU #23 are shown, together with the portions of the data transfer network which interconnect those two computers. Each pair of computers may be interconnected in the same manner as that shown for CU #0 and CU #23 in FIG.5a.

Computers CU #0 and CU #23 each contain a special memory section (M-0 and M-23, respectively) which includes 24 24-bit shift registers, the first and last shift registers of memory M-0 being labelled OSR-0 and OSR-23, respectively. The one shift register in each memory having the same numerical suffix as the computer in which it is installed does not connect directly to the data transfer network, but each of the other 23-shift registers do so connect via a single respective output or "A" line, and via a single respective input or B line, and control signals are applied (via a timing gate) from the transfer network to each shift register to provide shift pulses. The contents of the shift registers are read out bit-serial to other computers. In order to transfer a data word from computer CU # 0 to CU # 23, the word first must be placed in shift register OSR-23 of computer CU # 0, and in order to transfer a word from computer CU # 0 to CU # 1, the word first must be placed in shift register OSR-1 of computer CU #0, etc.

The computers of FIGS.5*a* and 5*b* utilize 24-bit instruction words and 23-bit data words. Each computer contains a 24-instruction register, the instruction registers for computers CU #0 and CU #23 being shown at IR-0 and IR-23 in FIG.5*b*. Instructions which pertain to internal operations to be performed solely within a given computer contain a zero in the zeroth bit place, plus a 7-bit operation code and two 8-bit address codes in the other 16-bit places. Transfer instructions which cause words to be routed between various of the computers, contain a logic 1 in the zeroth bit place. While each internal operation requires only a single instruction word, transfer instructions require two successive instruction words, each with a 1 in the zeroth bit place. The other 23 bits in each transfer instruction word specify the nature of the transfer to be made to each of the other computers, bit place 1 relating to the transfer to be made to computer CU #1, bit place 2 relating to the transfer to be made to CU #2, etc. If the two bits of the two successive transfer instructions relating to a given computer are both zero, no transfer will be made to the computer. If the first bit is 1 and the second bit is 0, a word will be read from that computer, if the first bit is 0 and the second is logic 1, a word will be transmitted to that computer, and if both bits are logic 1, a word will be read from that computer and a word simultaneously will be sent to that computer.

When the first of a pair of successive transfer instructions is placed in instruction register IR-0 of computer CU #0, the logic 1 zeroth bit pulses monostable flip-flop OF1, thereby enabling and gate OT1R, and thereby applying the other 23 bits of the first transfer instruction word to 23-bit register ORT-1 of computer CU #0. The reset of flip-flop OF1, together with the second logic 1 zeroth bit of the second transfer instruction word triggers monostable flip-flop OF2 as the second transfer instruction word is placed in register IR-0, thereby enabling gate OT2R and thereby applying the other 23 bits of the second transfer instruction word to 23-bit register ORT-2 of computer CU # 0. The zeroth bit of instruction register IR-0 is applied to flip-flops OF1 and OF2 via timing gate T T-0 which is enabled during clock times $T_3$ through $T_{28}$ of a 28-cycle machine frame.

Assume that a transfer is required in which CU # 0 will send a word to computer CU #23 and simultaneously receive a word from CU # 23. Such an operation requires logic 1 in bit place #23 during both of the transfer instructions, and provision of logic 1's in bit place #23 of the two successive instructions will be seen to result in logic 1's being written into bit place # 23 of registers ORT-1 and ORT-2. The writing of a lobic 1 in bit place #23 of either register ORT-1 or ORT-2 will be seen to apply a signal via or gate OM 23 to conditionally enable and gate O-23S.

During the first $T_1$ clock pulse following the two transfer instruction words, the logic 1 in bit place #23 of register ORT-1 will be seen to enable gate O-23T1, thereby applying a pulse over line 0-23D and via OR gate 023-0 to set flip-flop F23-0 in network DTN. The setting of flip-flop F23-0 conditionally enables gate G23-0, thereby connecting the output line 23-0A of shift register 23SR-0 of computer CU #23 to input line 23-OB of shift register OSR-23 of computer CU #0. The setting of flip-flop F23-0 also is applied over line 23-OC to computer CU #23, to be connected to the CU #23 control unit (not shown) via gates C-023 and O123 to prevent computer CU #23 from changing the contents of shift register 23SR-0 while they are being read out. The logic 1 signal on line 23-OC also is applied via or gate 23MO to conditionally enable gate 23-OS.

During the first $T_2$ clock pulse following the two transfer instruction words, the logic 1 in bit place #23 of register ORT-2 will be seen to enable and gate O-23T2, thereby applying a pulse over line O-23E and via OR gate OO-23 to set flip-flop FO-23. The setting of flip-flop FO-23 conditionally enables gate GO-23, thereby connecting output line O-23A of shift register OSR-23 of computer CU #0 to input line O-23B of shift register 23SR-0 of computer CU #23. The input and output lines of the two shift registers, OSR-23 of computer CU #0 and 23SR-0 of computer CU #23, then will be seen to be connected in a closed loop. The FO-23 output signal is also applied via line 23-OF to computer CU #23 to gate 23MO and to gate F-023. The signal to gate 23MO conditionally enables and gate 23-OS, which was previously conditionally enabled in this case due to the setting of flip-flop F23-0. The signal on line 23-OF from flip-flop FO-23 will be seen to conditionally enable gate 23-OS when CU #1 is executing a write transfer to CU #23, even if CU #1 is not simultaneously instructed to read from CU #23 and flip-flop F23-0 is not set. The signal from flip-flop FO-23 via line 23-OF to gate F-023 specifies to CU #23 that CU #1 will write a word, and the output of gate O123 prevents CU #23 from changing the contents of register 23SR-0 while CU #1 is writing into register 23SR-0.

Each of the conditionally enabled and gates O-23S and 23-OS is connected to receive output pulses from a respective OR gate TG-1 during 24 succeeding clock pulses $T_3$ through $T_{27}$. During the 24-clock pulses gate 23-OS applies shift pulses to shift register 23SR-0, thereby shifting out the word in shift register 23SR-0 of computer CU #23 through gate G-23-0 into shift register OSR-23 of computer CU #0, and and gate O-23S applies shift pulses to shift register OSR-23, thereby shifting out the word in shift register OSR-23 via gate GO-23 into shift register 23SR-0 of computer CU #23. After the 24-clock pulses have occurred, the words in the two-shift registers of the two computers will be seen to be interchanged. The occurrence of a further clock pulse $T_{28}$ then resets flip-flops F23-O and FO-23.

If bit #23 of the first transfer instruction word had been 0 instead of 1 as assumed, it will be seen that flip-flop F23-O would not have been set and the word in register 23SR-O would not have been sent to computer CU #0, but would have been lost as the word from CU #0 was shifted into register 23SR-0. Similarly, if bit place 23 of the second transfer instruction word had been 0 instead of 1 as assumed, but that of the first instruction word was still 1 as assumed, it will be seen that flip-flop FO-23 would not have been set and the word in register OSR-23 would not have been sent to computer CU #23, but would have been lost as the word from CU #23 was shifted into register OSR-23. Rather than losing a word as a new word is read into one of its shift registers, a "salvage" instruction may be programmed before a read instruction, so that the old contents of a shift register are shifted elsewhere in the computer memory as a new word is shifted into any shift register, as will be apparent at this point to those skilled in the art. If bit 23 was zero in both of the pair of transfer instructions, it will be apparent that neither flip-flop F23-O nor FO-23 would have been set, and that no data would have been interchanged between computers CU #0 and CU #23 during that machine frame of 28 clock pulses.

As mentioned above, each computer may be interconnected with each other computer in the manner illustrated for computers CU #0 and CU #23 in FIG. 5*b*, and hence words may be routed in either direction, or in both directions, between each computer and each other computer, all at the same time, with no computer required to wait in order to share the data transfer network with any other computer.

Flip-flops FO-23 and F23-O and gates GO-23 and G23-O are connected also to be controlled by the zero place bit of registers 23RT1 and 23RT2 of computer CU # 23. Computer CU # 23 is shown in FIG. 5*b* connected to the data transfere network by a single line 23-OD' rather than by sets of D and E lines in order to reduce the number of lines. A logic 1 in bit place # 0 of register 23RT1 will be seen to act through gates 23-OT1, 23OT and 23OH to cause flip-flop FO-23 to be set during a $T_1$ clock pulse, while a logic 1 in bit place #0 of register 23RT2 will be seen to act through gates 23-OT2, 23OT, 23OK and O23-O to cause flip-flop F23-O to be set during a $T_2$ clock pulse. The contents of registers 23RT1 and 23RT2 are supplied by placing two successive transfer instruction words in instruction register IR-23. Thus gate GO-23 is enabled either by a "write" transfer instruction in the program of computer CU # 0 or a "read" instruction in the program of computer CU # 23, gate G23-0 is enabled either by a "read" instruction in the program of computer CU # 0 or a write instruction in the program of computer CU # 23, and a read and write instruction in the program of either computer will enable both gates. A read instruction in one computer will be seen to provide the same data transfer as a write instruction in the other computer, and vice versa. When flip-flop FO-23 is set by a read transfer instruction in CU # 23, output line O-23C indicates C-23O computer CU # 0 (on line 11 via gates C-230 and 231O) that it must not change the contents of shift register OSR-23 during the ensuing readout portion ($T_3$ to $T_{27}$) of the machine frame. It will be seen that shift pulses must be applied to a given shift register whenever a transfer instruction in the computer in which it is contained requires that its contents be read or written or whenever a transfer instruction from the other computer with which it is associated requires that the contents be read or written. Outputs from bit place # 23 of register ORT-1 or ORT-2 will be seen to enable gate O-23S via or gate OM23 to apply shift pulses to register OSR-23 whenever a transfer instruction in computer CU # 1 requires reading from or writing into computer CU # 23, and an output from flip-flop FO-23 or F23-O will be seen to enable gate O-23S whenever a transfer instruction in computer CU #23 requires reading from or writing into computer CU #1.

In FIG. 5*c* the data transfer network is illustrated as including 23 23-bit registers, only the first, second and last being shown, which registers comprise the flip-flops, such as FO-23 and F23-O of FIG. 5b, 529 and gates, such as GO-23 and G23-O of FIG. 5b, and 529 or gates, such as OO-23 and O23-O of FIG. 5c, together with 23 "A" lines from each computer, 23 "D" lines from each computer, 23 "E" lines from each computer, 23 "B" lines out to each computer, 23 "C" lines out to each computer, and 23 "F" lines out to each computer. As mentioned above, the modified data transfer network of FIG. 5d allows one to eliminate the "D" and "E" lines.

In FIG. 5d parts generally similar to those of FIG. 5b are given corresponding designations. The outputs of and gates O-23T1 and O-23T2 are or'ed together by gate O-23T3, and its output or'ed in gate O-23T4 with the output line from shift register OSR-23, so that control signals may be sent over line O-23A during $T_1$ and $T_2$ clock times, and data during $T_3$–$T_{27}$ clock times. Within the data transfer network a 1 pulse received on line O-23A during $T_1$ time sets flip-flop F23-O via gates O-23 H1 and O23-O, and a 1 pulse received on line O-23A during $T_2$ time sets flip-flop FO-23 via gates O-23H2 and OO-23. Logic 1 pulses occurring on line 23-OA due to transfer instructions in computer CU # 23 are connected by identical circuitry to control the two flip-flops, with the $T_1$ and $T_2$ timing input connections interchanged. With flip-flop FO-23 set, the contents of register OSR-23 are transferred to register 23SR-O during the ensuing $T_3$–$T_{27}$ clock times. Inhibit inputs $\overline{T1}$ and $\overline{T2}$ may be applied as shown to gates GO-23 and G23-O to prevent the pulses occurring on line O-23A or line 23-OA during $T_1$ and $T_2$ times from being applied as inputs to the two shift registers, although such inhibiting signals are unnecessary with many types of shift registers. The remainder of the circuitry of FIG. 5d operates in the same manner as described above in connection with FIG. 5b to properly apply shift pulses and to prevent a non-controlling computer from changing the contents of one or more of its shift registers while another computer is reading from or writing into such shift registers.

At this point it will become apparent that the number of lines between each computer unit and data transfer network DTN may be reduced by additional multiplexing of the lines which connect each computer unit to data transfer network DTN, by provision of an additional clock time or times during a machine frame. For example, using only 46 lines between each computer and network DTN, with a pair of such lines being associated with each other computer, a logic 1 pulse during $T_1$ time may signify that the transmitting computer is preparing to write a word in another computer during data periods $T_5$ through $T_{29}$ of the frame, a logic 1 pulse during $T_2$ time may signify that the transmitting computer is preparing to read a word from another computer during data periods $T_5$ through $T_{29}$, and a logic 1 pulse during $T_3$ time may be used to send an interrupt signal to indicate to a computer that a word will be written into it, a logic 1 pulse during $T_4$ time may be used to send a "read" interrupt signal, clock times $T_5$ through $T_{29}$ may be used to shift data, and then clock time $T_{30}$ used to reset the flip-flops.

PREFERRED EMBODIMENT

The preferred embodiment of the invention shown in FIGS. 6–10 eliminates any need for the computational flow director and the start mask and data mask units by transmitting equivalent information over the data interchange network between computers, using suitable programming at the various computer units, in a manner to be described.

The exemplary computer unit shown in block form in FIG. 6 includes a 256-word integrated-circuit memory M together with associated addressing and bit-modifier circuits, an arithmetic unit AU which includes various registers and conventional switching circuits for performing arithmetic operations, and a control unit ACU which includes a program counter PC and varous other circuits to be described.

The execution of a typical instruction involves an instruction cycle time, during which the count in the program counter is applied to the memory address register and the instruction word is read out of the memory into the instruction register, and one or more execution cycles during which various circuits are controlled by the operation code and address portions of the word in the instruction register. As each instruction is placed in the instruction register, the operation code portion of each instruction is used to set an execution time counter ETC to a count which corresponds to the number of execution cycles which are required for the instruction to be performed. Successive clock pulses occurring during successive execution cycles as the instruction is executed then decrement execution time counter ETC, and when the counter is decremented to a reference count condition, such as zero, a gate circuit which senses the counter contents provides an "execution complete" or EC signal. The EC signal temporarily sets a flip-flop to establish the next clock period as an instruction cycle and advances the program counter to address the next instruction to be performed. If desired, various known techniques may be utilized to advance the program counter prior to completion of an instruction if the instruction being performed does not require memory access. During an execution cycle (or cycles) which follow an instruction cycle, words read from the memory are not directed to the instruction register but instead steered by switching circuits controlled by the operation code (1) to the operand register OPR or accumulator register A, for example, associated with the arithmetic unit, as when an arithmetic operation is to be performed, or (2) to the data bus lines of network DIN, as when a data word or a bit pattern, for example, is to be transmitted to one or several other computers.

In the simplified schematic diagram of FIG. 9 a "Run-Stop" flip-flop 175 is shown having its set input line connected to or gate 198, which is responsive to any one of a plurality of different inputs whichh serve to start the computer to execute its program, and having its reset or clear input line connected to or gate 199, which is responsive to a variety of input signals which halt the computer, so that it will finish the execution of any instruction it is then executing but not advance to a further instruction. One output of flip-flop 175, which is up during "Run" conditions, conditionally enables and gate 176a, so that receipt of an "execution completed" or EC signal will apply a clock pulse to advance the program counter to the next instruction. The EC signal is also applied via a pulser 210 and gate 210a to a monostable flip-flop 211, to raise the flip-flop I line during the next clock pulse to signify the occurrence of an instruction cycle. The high I signal during the instruction cycle enables gate 212 to connect a decoded number from decoder 213 into execution time counter ETC. During each instruction cycle the rise of output line I of flip-flop 211 also enables gate 171*a* via gate 215*a* to connect the memory output bus MOB via gate 171*b* to instruction register IR to place the instruction to be executed into register IR. Decoder 213 receives the op code of the new instruction placed in the instruction register and fills counter ETC with a count corresponding to the number of execution cycles required to perform the instruction. After flip-flop 211 resets, and gate 215 applies decrementing clock pulses to counter ETC, and when the count reaches a predetermined number, gate 214 provides a further "execution complete" signal. If a conditional skip instruction is being executed and the condition is satisfied, the program counter is advanced two steps when an EC signal is provided. The operation code in the instruction register is decoded by a decoder (not shown) to raise line SC whenever a conditional skip instruction is to be executed, and if the condition is met line SCE is raised. Then upon coccurrence of the "execution complete" or EC signal an output from and gate 214*a* is applied through flip-flop 212*a* to temporarily disable gate 215*a* and prevent the next instruction from being read into the instruction register as one clock pulse applied through gate 176*a* advances the program counter one step. Then as an output appears from delay 210*b* it temporarily sets flip-flop 210*c* to allow a further clock pulse to further advance the program counter, and the reset of flip-flop 212*a* then re-enables gate 215*a* and allows the second instruction to be read into instruction register IR. When a jump instruction is being executed, the op code portion of the instruction in register IR is decoded by a decoder (not shown) to raise line JP (FIG. 8), thereby enabling gate 260 to connect the memory output bus MOB to program counter PC to set the program counter to a new count specified by the word stored at a location specified by field 1 of the "Jump" instruction. A further gate 260*a* (FIG. 7) enabled by line JP connects the field 1 address to the memory address register MAR via OR gate 111. Many of the computer elements shown are utilized, of course, with altered configurations and different connections in some instances, when a computer executes "Class A" or "Class C" instructions, neither of which involve use of the data interchange network DIN, as well as when "Class B" instructions, which do involve use of network DIN, are executed. For sake of simplicity and so as not to obscure the present invention, most of the circuit connections which pertain solely to Class A and/or Class C instructions have been omitted from the drawings. Conditional skip and jump instructions, while they are Class A instructions performed solely within a single computer, are relevant to use of the data interchange network, since their use obviates the need for equipment comparable to the computational flow director, data mask unit and start mask unit of the embodiment of FIGS. 1–4, as will be explained below.

The preferred embodiment of the invention illustrated in FIGS. 6 through 10 utilizes a 32-bit instruction register and instruction words which may have as many as 32 bits, although less than 32 bits are used for many instructions. A 32-bit instruction word is comprised of four eight-bit bytes or fields numbered 0 through 3. The various instructions to be performed by a computer unit may be grouped into classes A, B and C. Class A instructions are each "no address" instructions, and each pertains to an operation to be performed entirely within the instruction computer which does not require access to the memory of the computer. Class B instructions each include one or several addresses, and each Class B instruction pertains to an operation to be performed over the network DIN, on one or several other computers. Class C instructions each contain a single address, and pertain to instructions to be performed entirely within a computer, but which involve access to the memory of that computer in order to fetch or store an operand.

FIG. 6*a* illustrates the format of Class A instructions, indicating that three zeros in the first three bit places of field 0 of an instruction word identifies it as a Class A instruction, while the five further bits of the field specify one of a total of as many as 32 Class A instructions which may be provided, and indicating that fields 1–3 are not used during Class A instructions.

FIG. 6*b* illustrates the format of Class B instructions. The 001 bit pattern in the first three bit places identifies an instruction as Class B, four further bits provide an op code specifying a particular one of as many as 16 different Class B instructions, and the last bit of field 0 specifies whether the address in field 1 is to be regarded as a direct or an indirect address. As will be seen below, most Class B instructions require three addresses, which may be specified in fields 1–3, though several require only one or two addresses and need use only one or two of those fields.

FIG. 6*c* illustrates the format of Class C instructions for three different instruction modes. A 1-bit in either the first or second bit place (or in both) of field 0 will be seen to identify the instruction as Class C, five further bits to provide an op code specifying a particular one of a maximum of 32 Class C instructions, and the last bit of field 0 indicating whether the address contained in field 1 is to be interpreted as a direct address or an indirect address. If the bit pattern in the first and second bits in 01, only the right-hand half of the word addressed by field 1 (and the field 0-I-bit) is used as the operand, while binary 10 or 11 bit patterns instead specify that the left-hand half of the addressed word, or the entire word, is to be used as the operand. All of the Class C instructions are single-address instructions.

FIGS.7 through 10 illustrate an exemplary arrangement which may be utilized to connect each computer unit to the data interchange network. FIGS. 7–10 contain both the principal circuits of a computer which are effective when the computer gains access to network DIN and those circuits which respond when the same computer unit is addressed or otherwise controlled over network DIN by another computer unit. Many of the components of the computer are utilized on either occasion, of course, being rendered operative by a "service granted" signal when the computer has control of data interchange network DIN, and being rendered operative by an $\overline{SG}$ or "Service Not granted" signal when some other computer has control of the network DIN. Many of the computer elements shown are utilized, of course, with altered configurations and different connections in some instances, when a computer execution Class A or Class C instructions, neither of which involve use of the data interchange network DIN, as well as when Class B instructions, which do involve use of network DIN, are executed. For sake of simplicity and so as not to obscure the present invention, most of the circuit connections which pertain solely to Class A and/or Class C instructions have been omitted from the drawings.

As in one previously described embodiment, a computer unit receives an SG or "service granted" signal from director DID when it gains access to or control of network DIN. In FIG. 7 the occurrence of an 001 signal in the first three bit spaces of field 0 of the computer instruction register IR, which signal identifies the instruction as a Class B instruction requiring control of network DIN, enables and gate 101, and as soon as an SG signal is received from direction DID, the op code bits (4–7) of field 0 are passed through and gates 102 to 105 to selectively energize the four function lines (F1 to F4) of network DIN. The DIN function lines F1 to F4 connect at each computer unit to a 4-to-16 decoder circuit 106, to energize a single decoder output line in accordance with the four-bit op code contained in bits 4–7 of the controlling computer unit. The decoder 106 output lines are numbered 0 through 15 in FIGS. 7–10 and the connection of an input wire carrying a number between 0 and 15 in those FIGS. is intended to indicate that that decoder 106 output line is applied as an input.

Of the maximum possible 16 Class B or DIN-controlling instructions which may be provided with a four-bit op code, the present embodiment includes the following, each of which is listed together with the decimal equivalent of its op code, which also identifies which decoder 106 output line is raised for each instruction.

| | | |
|---|---|---|
| 0 No instruction | 5 Set Bit | 10 Broadcast Halt |
| 1 Write | 6 Clear Bit | 11 Broadcast Start |
| 2 Broadcast Write | 7 Master Instruction Enable | 12 Broadcast Start |
| 3 Broadcast Write | 8 Master Instruction Disable | 13 Interrupt |
| 4 Read | 9 Broadcast Halt | 14 Master Instruction Enable |
| | | 15 Master Instruction Disable |

The precise nature of the operations performed by each instruction will be explained below.

"Write" instruction. By means of a "write" instruction the DIN-controlling computer unit is caused to write the word specified by the address in field 1 of the instruction into another computer unit identified by field 2 of the instruction, at a location in the other unit specified by field 3 of the instruction. Whether fields 1 and 3 of the instruction each are a direct or an indirect address in indicated by the eighth or "I" bits of fields 0 and 2, respectively. As the Write instruction raises output line 1 of decoder 106, an enabling signal is applied through gates 107–109 and **109*a* and 109*b*, thereby connecting the field 1 address of the instruction via gates 109*a* and 109*b* through gates 110 and 111 to memory address register MAR, as the inhibit input to gate 110 is initially low. If the I bit of field 0 is 0, field 1 remains applied to register MAR for the rest of the instruction. On the other hand, if the I bit is logic 1, a signal is applied via gates 112*a* and 113 and a delay device 114, disabling gate 110 after field 1 has been applied to register MAR for a predetermined time. During that time the memory output bus MOB is connected through gate 115, the inhibit input of which is initially low, to read the word then addressed by the field 1 address into buffer register 116. As the output of delay 114 rises after the predetermined time, as well as disabling gate 110 it enables gate 117, applying the buffer register contents to register MAR, and thereafter inhibiting or disabling gate 115. Thus the contents of the address specified by field 1 are then stored in register MAR. Decoder line 1 also enables gates 130 and 131 via gates 132 and 133, connecting the field 2 and field 3** portions of the instruction to the Y and Z address lines of network DIN.

If field 1 is a direct address, so that the field 0 I bit is 0, an output from inverter 134 applied through gate 135, together with an output from gate 136, enables gates 137 and 138, connecting the memory output bus MOB to the network DIN data lines at the beginning of the instruction. If the field 0 I bit is logic 1, however, gate 138 is not enabled to connect the bus MOB to the DIN data lines until the time when delay 114 provides an output to enable gate 140, thereby preventing the indirect address which first appears on bus MOB from being applied to the data lines of the DIN. Whenever gate 137 is enabled, whether immediately from a direct address or later from an indirect address, gates 137 and 225 enable gate 226, applying a signal via gates 227, 228 and 229 and delay 230 to pulser 231, to raise control line C1 to indicate that the data on the DIN data bus lines is stable.

Read Instruction. By means of a "read" instruction the DIN-controlling computer unit is caused to read a word located at an address specified by field 3 of the instruction within a computer unit specified by field 2 of the instruction and to store the word at a location within its own memory specified by field 1 of the instruction. Again, fields 1 and 3 may specify either direct or indirect addresses. A write instruction causes decoder output line 4 to be raised. The operation at the controlling computer is identical to that of a write instruction, since or gate 107 also responds to a decoder line 7, except that gate 142 is enabled instread of gate 137, and enabling of gate 143 by gate 142 connects the data lines of the DIN network into memory input bus MIB. Then upon receipt of a "data is stable" signal applied to control line C1 by the addressed computer, gate **142*a*** is enabled to raise the "write enable" line WE of memory M to write the word into the memory.

As will be apparent from the further decoder output lines (7–12) shown connected to or gate 107, an effective address specified by field 1 and the I bit of field 0 will be placed directly or indirectly in register MAR in the same manner when any one of the Class B instructions specified by op codes 7–12 is to be executed.

Broadcast Write. By means of a Broadcast write instruction the DIN-controlling computer is caused to transmit the data word contained at the location within its memory specified by field 1 of the instruction over network DIN to a selected group of other computer units specified by the bit pattern stored at a location specified by field 2 of the instruction, so that the data word will be stored at a location specified by field 3 in all of those computer units specified by the bit pattern. Since the bit pattern has a maximum of 32 bits, any selected ones of a maximum of 32 computer units may be arranged to receive the data word. To allow 32 further computer units to be written into the same fashion, two separate Broadcast Write instructions have been provided, one with an op code of 2 which allows writing into 32 computers Nos. 0–31, and another with an op code of 3, which allows writing into 32 computers Nos. 32–63.

When a Broadcast Write instruction is to be executed, decoder line 2 or line 3 is raised. A signal applied through gates 118 and 119 enables gate 120, temporarily applying field 2 of the instruction via gates 120 and 111 to register MAR, so that the bit pattern specified (directly) by field 2 is read from the memory, but shortly thereafter an output appears from delay 121 to disable gate 120. While gate 120 is enabled gate 141 is also enabled, thereby applying the bit pattern from memory output bus MOB to the data lines of network DIN. Simultaneously with the disabling of gate 120 the output of delay 121 is applied via gate 109 to enable gate 109*a*, thereafter applying field 1 via gates 109*a*, 109 *b* and 110 to register MAR, for the remainder of the instruction if the I bit of field 0 is 0, for direct addressing. On the other hand, if the I bit of field 0 is logic 1, the output of delay 121 also enables gate 122, and after a short time during which an address is read out of the memory into the buffer register, an output from delay 114 disables gate 110 and transfers the buffer register contents into register MAR in the same manner as previously described. The output from delay 121 also disables gate 141, disconnecting the memory bus MOB from the DIN data lines. If field 1 is a direct address the signal from inverter 134 immediately reconnects bus MOB to the DIN data bus, by means of gates 135–138, while a logic 1 I bit in field 0 results in bus MOB being reconnected to the DIN only after the output of delay 114 enables gate 140, thereby preventing the indirect address from being applied to the data lines of the DIN. As soon as the output from delay 121 rises, gate 145 is enabled to apply field 3 of the instruction to the Z address lines of the DIN. Whenever gate 135 is enabled, whether immediately from a direct address or later from an indirect address, gates 232 and 135 enable gate 233, applying a signal via gates 227, 228 and 229 and delay 230 to pulser 231, to raise control line C1 to indicate that the data is stable.

"Set Bit" and "Clear Bit" Instructions. By means of a Set Bit Instruction the DIN-controlling computer is caused to set the bit in the bit place specified by the rightmost five bits (4–8) of field 1 of the instruction in the word stored at a location specified by field 3 of the instruction within the memory of a particular computer unit specified by field 2 of the instruction. A Clear Bit instruction is identical except that the specified bit is cleared instread of set. The op codes for the two instructions are 5 and 6, respectively. The raising of either line 5 or line 6 of decoder 106 applies an output from or gate 124 to enable gates 125 and 126, which connects lines 4–8 of field 1 of the instruction to respective output lines of the data bus of network DIN. An output from gate 132 enables gates 133, 130 and 131, thereby connecting field 2 and field 3 of the instruction to the Y and Z address lines of network DIN. Inasmuch as field 1 of the instruction cannot be an indirect address, the data is connected to the DIN immediately at the beginning of either of these two instructions, and gate 236 immediately applies a signal via gates 227, 228 and 229 to delay 230, to provide a "data is stable" signal on control line C1 a fixed time after the beginning of the instruction.

Master Instruction Enable. This instruction enables the DIN-controlling computer to interrupt each of a selected group of other computers and to cause them each to execute simultaneously one or more successive instructions transmitted by the controlling computer, up until the time that they receive a Master Instruction Disable signal from a DIN-controlling computer. Field 1 of the instruction specifies an address in the controlling computer of the bit pattern specifying those computers which are to execute the succeeding instructions. An op code 7 input or 14 input to gate 107 operates to address the memory (either directly or indirectly) to fetch the bit pattern specified by field 1 in the same manner that the previously explained inputs to gate 107 address the memory in accordance with field 1. The "7" or "14" input to gate 136 enables gate 137, immediately (via gates 134 and 135) if field 1 is a direct address, or when the effective address is gated into register MAR in the case of indirect addressing, and the enabling of gate 137 enables gate 138 to apply the bit pattern from memory output bus MOB to the DIN network data bus lines. With decoder lines 8 and 15 also connected to gates 107 and 136, it will be seen that a "Master Instruction Disable" instruction similarly provides a bit pattern on the DIN network data bus lines. The output of gates 137 and 225 operate through gates 226–229 and delay 230 to raise control line C1 to indicate that the data in network DIN is stable in the same manner as during a "Write" instruction.

Broadcast Halt and Broadcast Start instructions. These instructions allow the DIN-controlling computer to start or to stop a selected group of other computer units in accordance with a selection specified by a bit pattern located at an address within the controlling computer specified by field 1 of the instruction. Two op codes (9 and 10) are provided for Broadcast Halt and two codes (11 and 12) provided for Broadcast Start, with each op code of one type being used to control a separate group of 32 computers. The decoder 106 output lines 9–12 are connected to or gate 107 and to or gate 136, and it will be apparent at this point that any one of the four instructions will result in the desired bit pattern being placed on the DIN network data lines. Control line C1 is raised to indicate a "data stable" condition in the same manner as during a Broadcast Write instruction, via gates 135, 232, 233, 227–229 and delay 230.

Interrupt. An Interrupt instruction allows the DIN-controlling computer unit to interrupt another computer specified by field 2 of the instruction, to cause the interrupted computer to store its three program status words at three successive ones of its memory locations, the first of which is specified by field 1, to substitute field 3 of the instruction into the program counter of the interrupted computer and then cause the interrupted computer to resume computation from the new program count. The rise of decoder line 13 for an interrupt instruction enables gate 127 (FIG. 7), thereby connecting field 1 of the instruction to eight of the DIN network data bus lines, and applies a signal through gate 132 to enable gates 133, 130 and 131, thereby applying field 2 and field 3 of the instruction to the Y and Z address lines, respectively, of the DIN network. Control line C1 is raised to indicate a "data stable" condition in the same manner as during a set bit or clear bit instruction, via gates 236, 227 to 229 and delay 230.

Now, to understand the operation of each computer when it is not controlling network DIN, it will be seen that its decoder 106 is connected to the four DIN function lines F1 to F4, and will be understood that it provides the same output signals from its decoder as those provided from the decoder 106 of the controlling computer unit. As mentioned above, all of the computer units not controlling the network DIN will receive an $\overline{SG}$ signal from director DID.

At each non-controlling computer unit the Y address lines of the DIN network are decoded by a decoder YD, and the decoder outputs compared with the contents of an identification register IDR which may be set to identify each computer unit with a respective unit number. Since the identification of a given computer unit ordinarily will not be changed as computation proceeds, the idenfitication register may comprise a set of simple swtiches set either manually or by means of a punched card or the like. When the Y address received over the Y address lines corresponds to the computer unit number, a $Y_i$ signal is provided by gate 150. The occurrence of a Write, a Read, a Set Bit, a Clear Bit or an Interrupt instruction results in a Y unit address being placed on the Y address lines of the DIN by the controlling computer, and the occurrence of these instructions energizes decoder 106 output line 1, 4, 5, 6 or 13, respectively at each non-controlling computer unit. Upon the occurrence of any one of the first four of these instructions an output from or gate 151 (FIG. 7) is combined with the outputs of gates 150 and 152 at the addressed computer unit to enable gate 153, thereby enabling gate 154 to connect the Z address lines of the network DIN via or gates 109*a* and 109*b* to gate 110, the inhibit input which is initially low, thereby applying the Z address via gate 111 to register MAR of the addressed computer. If the I bit of field 2 carried on the Y address lines is low, meaning that the Z address is a direct address, gate 110 remains enabled for the rest of the instruction. On the other hand, if the I bit is logic 1, the outputs of gates 155 and 151 enable gate 112*b*, applying a signal via gate 113 to delay 114, disabling gate 110 after a short time. While gate 110 is enabled the memory output bus MOB is connected via gate 115 to read the indirect address word into the buffer register, and then the rise of the delayed signal from delay 114 disables gate 115 and enables gate 117 to transfer the contents of the buffer register to register MAR.

During a Write instruction decoder line 1 enables gate 155*d* (FIG. 8), thereby connecting the data bus of network DIN via gates 156 and 157 to the memory intpu bus MIB, so that the data word transferred over network DIN will be written into the memory, at the address specified by the Z address lines. When gate 209 has been enabled, a "data stable" pulse put on control line C1 by the controlling computer enables gate 155*a* and gate 155*b* to energize the write enable line WE of the memory via gate 111*a*. The output of gate 155*a* is also applied via gates 242 and 239 (FIG.10) and delay 253 to raise control line C2 after a predetermined time to indicate that the data has been read from the DIN and written into the memory. During a Read instruction, decoder 106 line 4 enables gate 158, thereby enabling gate 159 to connect bus MOB to the DIN data bus. When gate 209 has been enabled, a signal is applied via gates 234, 235 and 229 and delay 230 to raise control line C1 to a "data is stable" condition after a predetermined time. During a Set Bit or Clear Bit instruction, at the addressed computer unit an output from or gate 161 enables gate 162, thereby enabling gate 163 to apply the output of bit modifier circuit BM to memory input bus MIB, via gate 157, and also enabling gate 163a to connect 5 lines (0–4) of the DIN data bus to bit modifier decoder BM, which selects the bit which is to be set or cleared. The application of a "5" or "6" signal from decoder 106 to bit modifier BM determines whether the bit is set of cleared as the word passes from the memory output bus through the bit modifier to the memory input bus. During a Write instruction the DIN network data lines are not connected to memory bus MIB, during a Read instruction the memory output bus MOB is not connected to the DIN data lines, and during set bit and clear bit instructions the bit modifier is not connected to the memory input bus, until, in each case, any indirect addressing has been completed. Gate 209 will be seen to allow gate 155, gate 158 or gate 162 to be enabled immediately if the I-bit on the Y address lines is logic 0, but only after indirect addressing has been completed, as signified by the rise in the output from delay 114, if the I-bit is logic 1. When gate 209 has been enabled, a "data stable" signal put on control line C1 by the controlling computer enables gate 155*a* via gate 155*b* to energize line WE of the memory. The output of gate 155*a* also is applied via gates 242, 239 and delay 253 to raise control line C2 after a predtermined time, in the same manner as during a Write instruction.

During each of the four Y-address instructions (Write, Read, Set Bit, , Clear Bit), and also during Broadcast Write instructions, a computer unit addressed over the DIN by a Y address or identified by a bit pattern has its memory controlled by DIN signals from another computer, and hence its own program must be interrupted if its program reaches an instruction which requires access to its memory. The op code in the instruction register IR of each non-controlling computer is applied via gate 202 to decoder 203, which provides an output signal whenever an instruction to be performed (whether Class B or Class C) requires memory access. That output signal is applied to and gate 201, which is enabled via or gate 204 whenever a Write, Read, Set Bit or Clear Bit instruction to be performed on the addressed computer provides an output from gate 153, or whenever a Broadcast Write instruction to be received by the computer provides an output from gate 147. The enabling of gate 201 disables gate 248, preventing further clock pulses from being routed to the program counter so long as the gate 201 remains high. When the gate 201 output falls, monostable flipflop 248 applies a pulse via gate 198 to set flip-flop 175 and then the computer can continue through its program.

When the controlling CU is to execute a Broadcast Write instruction, at each non-controlling computer unit decoder 106 line 2 or line 3 is raised, applying a signal via gates 118 and 146 to enable gate 147 if the AL line of the non-controlling computer is up. The bit pattern on the DIN data bus is anded by gate 165 with the contents of the computer unit identification register IDR to raise line AL if the data bus line associated with the assigned number of the computer unit is logic 1. After a time provided by delay 148, gate 166 will be enabled to connect the Z address on network DIN directly to register MAR via OR gate 111, and gate 167 will be enabled to connect the data word on the DIN data bus via gate 157 to memory input bus MIB. When control line C1 is raised by the controlling computer, signals from gates 155*b*, 155*a* and 111*a* result in energization of the memory "write enable" line WE. The output of gate 155*a* also operates via gates 242, 242*a*, 239 and delay 253 to raise line C2 after a predetermined time. The field 3 address of the instruction is always assumed to be a direct address.

Whenever the controlling computer unit transmits a bit pattern (i.e., for op codes 2, 3 and 7 through 15), the AL line is raised in each non-controlling computer unit specified by the bit pattern, in a manner described above. During each of these instructions the rise of the AL line at each non-controlling computer unit connects the output of its respective flip-flop **253*a* to control line C2 by means of electronic switch 253*b*. Each such flip-flop is arranged to hold control line C2 at a logic 0 level when the flip-flop is in its stable or reset state irrespective of the states of the counterpart flip-flops in other computers, and hence when a bit pattern is transmitted, control line C2 remains low until all of the computers specified by the bit pattern have responded by temporarily setting their flip-flop 253*a***.

When the controlling CU is to perform a "Master Instruction Enable" at a group of computers specified by the bit pattern which it transmits, function decoder line 7 or line 14 and the AL line at each selected computer enable gate 168 via gate **168*a* or 168*b* and gate 168*c*, thereby setting flip-flop 169 after a short delay provided by delay 170. Setting of flip-flop 169 enables gate 171, thereby connecting the DIN data bus to instruction regiser IR of the addressed computer. The setting of flip-flop 169 also connects the signal from gate 246*a* through gate 246 to gate 242, thereby to raise line C2 after a predetermined time to indicate that the master instruction enable bit has been responded to. The output of gate 168 is also applied via or gate 199 to clear "Run-Stop" flip-flop 175, to thereby interrupt the program of the addressed computer. A later "Master Instruction Disable" instruction results in either decoder line 8 or line 15 being up and causes gate 172 to be enabled via gate 172*a* or 172*b* and 172*c*, thereby clearing flip-flop 169 and disabling gate 171, and thereby setting flip-flop 175** to return the computer to a "Run" condition.

After a given computer has been addressed with a "Master Instruction enable" bit and before it has been addressed by a later "Master Instruction Disable" bit, succeeding instructions placed on network DIN by the controlling computer are applied to the instruction register of the given computer. As each of a series of such instructions appear on the network DIN data bus lines, the fact that they are received is sensed as C1 pulses are received. The C1 pulses are combined with the set output of flip-flop 169 at and gate 250, to apply a pulse via gate 242 to raise control line C2 after each succeeding instruction is received.

A "Broadcast Halt" by the controlling computer with one op code raises function decoder line 9, while a Broadcast Halt using the other op code raises line 10. Two bits in its indentification register specify whether a given non-controlling CU is to respond to one op code or the other. Thus raising of either line 9 or line 10 of the function decoder enables gate 174 through gates 176 and 177 or through gates 178 and 177. The enabling of gate 174 clears "Run-Stop" flip-flop 175 within the control unit of the computer, preventing the computer program counter from being further advanced. A Broadcast Start by the controlling computers similarly raises function decoder line 11 or line 12, depending upon the op code, to set flip-flop 175 via gate 181 or 182 and gates 180, 179 and 198, so that the computer program counter may be advanced. Neither Broadcast Start nor Broadcast Halt instructions require that a non-controlling CU respond with a "data has been read" control line signal.

When the controlling computer is to perform an interrupt instruction, function line decoder 106 output line 13 at the addressed computer is raised, thereby enabling gate 183 of the addressed computer, setting flip-flops **184*c* and 184 (after execution is complete), so that clock pulses pass through gate 185 to a five-state counter 186. During the first state to which counter 186 is advanced, gate 187 is enabled to connect lines 0–7 of the DIN data bus to register MAR to apply a (direct) starting address to the memory, and gate 186 is enabled to connect the contents of the status register SR and the program counter PC to memory input bus MIB (via OR gate 157), each of these contents being 16 bits. It is assumed that the starting address on the DIN data lines is stable by the time counter 186 reaches its first state, so that gate 187 does not need a C1 input. Flip-flop 184 also applies a pulse via MS flip-flop 184*a* and gate 199 to clear Run-Stop flip-flop 175 to prevent advancement of the program counter, disables gate 197*a* which ordinarily connects the program counter contents to the memory address register MAR, and connects the stages of register MAR as a counter. During the second state of counter 186, a logic signal is applied via gate 190 to enable gate 191, thereby applying a pulse to register MAR, which is then connected to be advanced as a counter, and after a brief delay provided by delay 192 gate 193 is enabled to apply the accumulator or "A" register contents via gate 157 to bus MIB, and a write enable signal is applied to memory M via gates 192*a* and 111*a*. During the third state of counter 186 a signal applied via gates 190 and 191 again advances register MAR by one count, and after a delay provided by delay 194 gate 195 applies the B register contents via gate 157 to bus MIB. During the fourth state of counter 186, gate 196 is enabled to connect the Z address lines on network DIN to the program counter PC to apply a new program count. As counter 186 is advanced to its fifth or "zero"state, flip-flop 184 is cleared to prevent further advancement of counter 186 and to reconnect register MAR as a register, and a pulse is applied by monostable flip-flop 197 via gate 198 to set flip-flop 175 to a set or "Run" condition, and then the interrupted computer resumes computation from the new program count. The pulse from flip-flop 197 is also applied via gates 252, 242, 239 and delay 253 to raise control line 2**, to indicate to the controlling computer that all of the data, on the DIN address lines as well as the data lines, has been read.

CONTROL OF COMPUTATIONAL FLOW

As mentioned above, the multicomputer system of FIGS. 6–10 requires no computational flow director nor any start mask or data mask units, but still allows computational flow to progress so that the halting of one or a selected group of computer units will operate to start one or a selected group of other computer units. Each given computer unit may be programmed with a plurality of 32-bit "start-mask" words stored at selected memory addresses, with each such word indicating a particular combination of other computers from which halt signals should be received prior to starting the given computer. If computer CU # 1 reaches a point in its program where it should wait and then progress further through its program only after computers CU # 3, CU # 5 and CU # 7 have halted or have reached desired points in their programs, one "start-mask" word stored in computer CU # 1 is provided with logic 1 bits in its third, fifth and seventh bit places, and when computer CU # 1 reaches the mentioned point in its program, it is provided with a sequence of instructions including a first instruction to load that start mask-word into its sense register, a second instruction to skip the next instruction if the sense register is entirely cleared, a third instruction to jump back to the second instruction, and then fourth and further instructions to continue toward completing its program. Computer units CU # 3, CU # 5 and CU # 7 are each programmed with a "clear bit" instruction to clear a respective bit in the sense register of computer CU # 1 (and perhaps specified bits in the sense registers of other computer units) immediately or slightly prior to reaching halt instructions or the mentioned desired points in their programs. When computer CU # 1 reaches the conditional skip second instruction, if computers CU # 3, CU # 5 and CU # 7 have not all cleared the CU # 1 sense register, computer CU # 1 will not skip the third or jump instruction, but will jump back to the conditional skip second instruction, via other instructions in some instances, and will repeatedly execute the conditional skip and jump instructions. However, as soon as computers CU # 3, CU # 5 and CU # 7 have cleared the logic 1 bits from the CU #1 sense register, computer CU # 1 in executing the conditional skip instruction will skip the jump instruction and proceed to execute the fourth and ensuing instructions. The fourth instruction may comprises a "Broadcast Start" instruction, if desired, so that execution of that instruction starts a plurality of other computer units specified by the bit pattern included in the Broadcast Start instruction.

The accumulator register in a computer may be connected to a conventional gate circuit which indicates when the accumulator is entirely cleared, and if one memory address is used to allow other computers to address the accumulator to clear bits, the accumulator may be used as the mentioned sense register. Alternatively, one word location of the memory may be used as the sense register and the contents of that word location can be loaded into the accumulator prior to the conditional skip instruction, with each jump instruction causing a jump back to the load instructions. As a third alternative, a separate sense register with gates to sense a cleared condition may be provided in each computer, with the sense register being addressable both by the computer itself to load a start mask word and by other computers to clear bits.

The starting of a group of computers may be made to occur in synchronism with a clock condition, or any other condition, as well as only after the halting or reaching of specified program steps by a specified group of other computers, by inserting a further conditional skip and a further jump instruction in the program just prior to the mentioned fourth instruction. For example, if the third instruction described above is followed by an instruction to skip the following instruction if a clock or other desired condition is present and then a jump instruction back to the previous conditional skip instruction, upon clearing of the three mentioned start-mask bits, execution of the added conditional skip and jump instructions will occur repeatedly until the clock or other condition occurs, whereupon the computer will skip the last jump instruction and execute the Broadcast Start and other steps of its program.

By provision of Broadcast Start, Clear Bit and Broadcast Write instructions performed over the network DIN, it will be seen that the need for the computational flow director and the start-mask and data mask units has been eliminated, and that the many connections needed in FIG. 1 between the computer units and such units has been eliminated, at the expense of requiring added use of the network DIN and additional program steps in the individual computers.

While the computer unit of FIGS. 7–10 has been shown connected via many gates to a single data interchange network DIN, it is quite within the scope of the invention to provide two or more DIN networks to be time-shared by the various computers of a multicomputer system. In FIGS. 7–10 various signals are connected through gates from the computer out to the single network DIN, and various other signals are connected through gates from the network DIN into the computer. When two DIN networks are utilized, various gate circuits may be duplicated to allow signals to be transmitted over or received from each network DIN. In FIG. 11 two separate DIN networks DIN-A and DIN-B are shown. While a single gate circuit 138 is shown in FIG. 8 to connect the computer memory output bus to the data lines of the sigle network DIN, FIG. 11 shows bus MOB connected through gate 138A to the data lines of network DIN-A and through gate 138B to the date lines of network DIN-B. While the single network embodiment of FIGS. 6–10 assumes the use of a single "service granted" or SG line from director DID to each computer, plural network embodiments utilize a plurality of "service granted" lines, one to each computer for each DIN network. Thus in FIG. 11 an output signal from gate 137 will enable gate 138A to connect the memory output bus of computer CU # 1 to the data lines of DIN-A when an SG1A "service granted" signal is received by computer CU # 1, while receipt by computer CU # 1 of an SG1B "service granted" signal instead will enable gate 138B to connect bus MOB to the data lines of DIN-B. As will become apparent below in connection with FIGS. 12*a* to 12*c*, only one or the other of the two service granted signals can exist at a given time. In modifying the computer of FIGS. 6–10 to operate with two DIN networks, each of the other gate circuits (131, 145, 130, 126, 127, 159, 141 and 143) which apply signals to a DIN network when service is granted to the computer may be similarly modified so as to selectively apply such signals to network DIN-A or network DIN-B.

While the data lines of the single network DIN in FIG. 8 are shown connected into gate 157 and memory input bus MOB through a single gate circuit 156, they are instead connected through two separate gates 156A and 156B in FIG. 11. However, most of the gate circuits which connect DIN signals into a computer do not have to be duplicated when two DIN networks are used, since conflict circuitry to be described in connection with FIGS. 12*a* to 12*c* prevent a given computer unit from being addressed over more than one network DIN at a given time. Thus in order to modify the computer of FIGS. 6–10 for use of two DIN networks, the two DIN networks should apply signals into and gates 171, 154, 166, 187, 167, 156, 163*a* and 196 through eight or circuits (not shown). FIGS. 12*a*, 12*b* and 12*c* partially illustrate a data interchange director arrangement by means of which a multicomputer comprising computer units of the type illustrated in FIGS. 6–10 may be connected to time-share a pair of data interchange networks. When a computer is to execute a Class B instruction, the first three bits of field 0 in its instruction register provide a service request signal SR fron gate 101, as was explained above in connection with FIG. 7. Whenever control of network DIN-A or network DIN-B has been granted director DID to any computer, director DID provides an SGA or an SGB signal, respectively, to the computer granted control. If director DID has one (or two) free networks when a service request signal is received, gate 269 (FIG. 12*a*) will be enabled, applying the SR signal (labelled SR-1 and assumed to come from computer CU #1) to logic tree 263, which may take the same form as the logic tree shown in FIG. 4*a*. If neither network is in use, a service request results in network DIN-A being selected. If one network is in use a service request selects the other network. If both networks are in use, neither network is selected.

In the specific two-network embodiment illustrated in FIGS. 11 and 12*a* to 12*c*, each DIN network includes a further line which is unnecessary in multicomputer installations which use a single DIN network, the further lines of the two DIN networks being labelled HLA nad HLB, respectively. Also, a pair of further lines YLA nad YLB (with numerical suffixes) are routed from each computer unit to the data interchange director DID, and two "service granted" lines SGA and SGB (with numerical suffixes) extend from director DID to each computer unit. For example, lines YLA-1 and YLB-1 run from computer CU # 1 to director DID, and lines SG-1A and SG-1B run from director DID to computer CU # 1. The YLA line leading from each computer unit is raised by the computer unit whenever the computer unit is being addressed by another computer unit over DIN network DIN-A, while the YLB line is raised whenever it is being addressed over network DIN-B. In FIG. 7, Y address decoder YD is shown connected to the Y address lines of a single DIN network and gate 165 is shown connected to the data bus lines of a single DIN network. In multicomputer installations utilizing two (or more) DIN networks, the YD decoder, gates 150 and 152, and gate 165 circuits may be duplicated at each computer, with a separate YD decoder and a gate 165 being connected to each of the two DIN networks. In FIG. 11 addressing of computer CU #1 over the Y address lines of network DIN-A enables gate 150A through decoder YDA, while addressing computer CU # 1 with a bit pattern on the data lines of network DIN-A enables gate 165A. The outputs of gates 150A and 165A are connected to or gate YLA, thereby raising line YLA-1 whenever computer unit CU #1 is addressed over network DIN-A. Decoder YDB and gates 150B, 165B and YLB operate similarly to raise line YLB-1 whenever computer CU # 1 is addressed over network DIN-B. A pair of lines similar to YLA-1 and YLB-1 lead from each computer unit to director DID.

Referring to FIG. 12*a*, when neither DIN network has been put under the control of a computer, so that both lines SGA and SGB in director DID are low, gate 265 is enabled, raising line TF. If, on the other hand, only the DIN-A network is in use gate 266 is enabled, raising line BF, and if only the DIN-B network is in use gate 267 is enabled, raising line AF. When computer CU # 1 raises its SR line (SR-1) to request control of one of the two DIN networks, the TF signal will pass through gate 268 and enable gate 269 if neither DIN network is then in use. If only network DIN-B is not in use, line BF will conditionally enable gate 270. If the YLA line (YLA-1) associated with that computer (CU #1) is then up, gate 270 will be inhibited, thereby preventing gate 269 from being enabled until the YLA line falls, thereby preventing a service request from a given computer from being processed until the given computer is not being addressed over DIN-A by some other computer. Gate 271 operates similarly, to prevent a computer from obtaining access to DIN-A while it is being addressed over DIN-B by some other computer.

As soon as a given computer requesting DIN service is not being addressed by some other computer, gates 269 and 272 associated with the given computer, but located in the DID, are both enabled, applying the service request signal and the three-bit priority level signal associated with that computer to a logic tree within director DID. A separate gating circuit like that of gates 268–272 and a separate logic tree is provided within director DID for each other computer unit. Each logic tree may take the form of that shown in FIG. 4*a*, wherein a selected one of eight output lines is energized to indicate a priority level. The logic trees from all of the computer units are connected to a decision circuit, the function of which will become clear from FIG. 12*b*, wherein gate circuits for granting DIN service to only two computer units, Nos. 1 and 63 are shown. The eight logic tree output lines from each logic tree connect to the decision gate circuits associated with all of the computer units. The nature of the decision gate circuits may be understood by considering the labelled inputs in FIG. 12*b*. Gate 276 is enabled when computer CU # 1 requests service with a zero level priority (which is highest priority) if all lower-numbered computer units (of which there is just one, CU # 0) are not then requesting service with zero level priority, gate 277 is enabled when CU # 1 requests service with a level 1 priority if computer CU # 0 is not then requesting service with either a level 0 or a level 1 priority, and if none of computers CU # 2 through CU # 63 is then requesting service with a level 0 priority, etc. Whenever CU # 1 requests service with a priority level equal to or higher than any simultaneous requests from higher numbered computer units and at a priority level higher than that of any simultaneous request from CU #0, an output will be applied through or gate 280 to set flip-flop 281, raising line SG-1 to grant DIN service to computer unit CU # 1. If neither DIN network is then in service, or if only network DIN-B is then in service, an output from gate 282 and line SG-1 enable gate 283 to raise line SG-1A, thereby putting computer unit CU #1 in control of network DIN-A. If network DIN-A is already in service, gate 284 will be enabled instead to put computer CU # 1 in control of network DIN-B. Assuming that gate 283 is enabled, the raising of line SG-1A operates back at computer CU # 1 to connect a large number of circuits to network DIN-A and to slave the SG inputs shown in FIGS. 7–10 to the SG-1A line. Conversely, if network DIN-A is already in service, the enabling of gate 284 and raising of line SG-1B operates back at computer CU # 1 to conditionally enable a large number of gates which connect computer CU # 1 out to network DIN-B, and to make the SG inputs shown in FIGS. 7–10 follow the SG-1B line from director DID. When either gate 283 or 284 is enabled it applies an inhibit input to the other. Thus if gate 283 is initially enabled and then network DIN-B then later becomes available, the inhibit signal applied from gate 283 to gate 284 prevents line SG-1B from being raised, and hence only one of the two "service granted" lines associated with a given computer may be raised at any given time.

When flip-flop 281 is set, its output is applied to inhibit gate 275, thereby disconnecting the CU # 1 logic tree outputs from the selection gate circuits, and allowing the selection gate circuits to respond then or later to any simultaneous service requests of lower priority (or of the same priority from lower-numbered computer units), assuming that both DIN networks are not then in use. If some other computer already had control of one DIN network when flip-flop 281 was set, so that both networks would now be in use, both lines SGA and SGB in director DID would be high, thereby preventing any further service requests from being processed until one of the two computers controlling the two networks reaches a Class A or Class C instruction and no longer requires control of a DIN, so that the fall of its SR signal resets its flip-flop. The SG-1A output line of gate 283 is connected, together with the counterpart lines from similar gates associated with all of the other computers, to or gate 286, which provides the SGA signal within director DID indicating that control of DIN-A has been granted to some computer, and similar connections are made from and gate 284 and counterpart gates associated with all of the other computers to or gate 287, to provide the SGB signal within director DID.

When two computer units are separately controlling the two DIN networks, a conflict will arise if one attempts to address the other (either specifically with a unit address or by means of a bit pattern) or if both units attempt simultaneously to control the same third unit or overlapping groups of units. FIG. 12c illustrates an arrangement for determining which one of the two units shall have priority over the other and temporarily halts one of the two units, without causing the halted unit to completely lose control of the DIN network which it is then controlling, however.

When a given computer unit is given control of a DIN network, an and gate within director DID is enabled to apply the three-bit priority level signal associated with that computer unit to a comparison circuit with director DID. FIG. 12c assumes that computer CU # 1 is controlling network DIN-A and that computer CU # 2 is simultaneously controlling DIN-B, and their priority level signals are shown applied to the comparison circuit via gate circuits 289-1 and 290-2. Though not shown in FIG. 12c, the three-bit priority level signal in director DID from each computer is connected to the three input lines 289a–c of the comparison circuit through an and gate similar to gate 289-1 when the decision circuit grants control of network DIN-A to the computer, and also connected to the other three input lines 290a–c via an and gate similar to gate 290–1 when the decision circuit grants control of network DIN-B to the computer. If the priority level signal from computer CU # 1 is higher than or equal to that from CU # 2, an output from gate 291 of the comparison circuit will enable gate 292, while a higher priority level signal from CU # 2 will provide an output from gate 293 to enable gate 294. The sense of each output line from gates 289 and 290 is shown reversed or inverted from the arrangement previously used, so that higher binary number signals out of gates 289–1 and 290–2 indicate higher priority. If the most significant (MS) bit from gate 289-1 is 1 and that from gate 290-2 is 0, gate 295 provides a signal to gate 291, while the reverse condition results in gate 296 providing an output to gate 293. If both MS bits are 1 or 0 gate 297 or 298 provides an output through gate 299 to gates 300 and 301. Then if the middle bit from gate 289–1 is 1 and that from gate 290–2 is 0, gate 300 provides an output to gate 291, while the reverse condition results in gate 301 providing an output to gate 293. If both middle bits are logic 1 or logic 0, gate 302 or 303 provides an output from gate 304 to gates 305 and 306. If the least-significant (LS) bit from gate 289–1 is logic 1 and that from gate 290–2 is logic 0, gate 305 provides an output to gate 291 while the reverse condition results in gate 306 providing an output to gate 293. If the LS bits from both gates 289–1 and 290–2 are also both logic 1 or logic 0, gate 307 or gate 308 provides an output through gate 309 to gate 291. If one desires that the computer controlling network DIN-B instead be given priority when both DIN-controlling computers have equal priority level signals in their priority level registers, the output of gate 309 should instead be applied to or gate 293. It will be seen that at any time during which two computers are controlling the two DIN networks one or the other (but not both) of gates 291 and 293 will provide an output to indicate which DIN is being controlled by the computer having higher priority.

The YLA and YLB inputs to data interchange director DID from each computer unit are anded together by gates such as 311–313, so that an output will appear from one of the and gates into or gate 315 whenever one of the computer units is being addressed (whether by a specific unit address or by part of a bit pattern) simultaneously over both DIN networks. Also, when both DIN networks are in use, each computer unit which has control of a DIN is tested to determine whether the other computer unit is attempting to address it over the other DIN. As shown in FIG. 12c where computer CU # 1 is assumed to be controlling network DIN-A and computer CU # 2 assumed to be controlling network DIN-B, and gate 316a will provide an output to gate 314 if computer CU # 2 attempts to address computer CU # 1 over network DIN-B while and gate 317 a will provide an output if computer CU #1 is attempting to address computer CU #2 over network DIN-A. The SGA line associated with each computer is anded with the YLB line associated with the same computer (as typified by gates 316a and 317b) to provide inputs to gate 314, and the SGB line associated with each computer is anded with the YLA line associated with the same computer (as typified by gates 316b and 317a) to provide inputs to gate 314. Thus gate 314 provides an output whenever one DIN-controlling computer addresses the other DIN-controlling computer. The and gate outputs (311–313) and the output of gate 314 are applied to or gate 315 to provide a conflict signal. The conflict signal is applied to the gates 292 and 294. If computer CU # 1 has an equal or higher level priority signal in its priority level register than CU # 2 so that gate 291 provides an output, gate 292 will be enabled, thereby providing a signal on "hold" line HB of network DIN-B being controlled by computer CU # 2. If, on the other hand computer CU #2 has a higher priority level signal, gate 294 will be enabled, thereby providing a hold a hold signal on line HA of DIN-A. Assuming the latter situation, so that line HA of DIN-A is raised, back at computer CU # 1 as shown in FIG. 11, the hold signal is connected via gate 319A, which is enabled by the SG-1A signal, and via gate 319C to flip-flop 211, to hold the flip-flop in an instruction cycle state, thereby preventing computer CU # 1 from executing its conflicting instruction until computer CU # 2 finishes executing its instruction, but not relinquishing control of DIN-A.

In installations where two DIN networks are used the SGA and SGB signal lines from director DID to each computer are connected through or gate 320 in the computer, as shown in FIG. 11, to raise the SG line of the computer if director DID grants control of either interchange network to the computer. However, if a "hold" signal is received over the network which the computer is granted control of, indicating that a conflict exists and that the other DIN-controlling computer has higher priority, the output of the or gate is inhibited, temporarily lowering the SG line of the lower priority DIN-controlling computer, so that it may respond properly if it is being addressed by the higher priority DIN-controlling computer. Also, the receipt by a DIN-controlling computer of a "hold" signal on the hold line of the DIN network which it is controlling prevents the computer which is being temporarily held from applying a function line code to the DIN network which it is controlling, thereby preventing any further computer addressed by the instruction then in the held computer from executing or otherwise responding to the held instruction. In FIG. 11 the four Class B operation code bits of field 0 of the instruction registers are selectively applied via gate 321 or 322 to the DIN-A or DIN-B function lines in accordance with whether service is granted on network DIN-A or network DIN-B, but irrespective of which network the computer gains control of, a hold signal on the hold line of that network will inhibit the gate to prevent transmission of the operation code. When a computer is not requesting control of either network but is addressed over a DIN network by another computer, the function lines of the appropriate DIN network are connected to the computer function decoder 106 by gates 323 and 325, or by gates 324 and 325. If two other computers attempt to address a third computer simultaneously, the conflict-sensing circuits within director DID hold the one of the two computers having lower priority, and hence only one or the other of gates 323 and 324 can be enabled at a given time.

When a computer has been granted control of a DIN network, selective enabling of gate 326 or 327, and of gate 328 or 329 insures that the computer will receive "data is stable" and "data has been read" signals from the control lines of the proper DIN network to energize the C1 and C2 control lines within the computer, and selective enabling of gate 332 or 333 and gate 334 or 335 insures that the computer will output such signals onto the control lines of the proper DIN network.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Electronic computer apparatus capable of simultaneous data transmission in both directions between pairs of computers, comprising in combination: a plurality of computers, each of said computers including a respective arithmetic unit, a respective memory means for storing a respective plurality of data words in respective word locations and a respective plurality of instruction words in respective word locations, and a respective control unit for providing execution by said arithmetic unit of said instruction words stored in said memory means; a data interchange network comprising a plurality of gating circuits, each of said gating circuits being associated with a respective pair of said computers and operable to provide data transmission in both directions between the respective pair of said computers with which it is associated, and each of said gating circuits being connected between a respective word location in the memory means of one computer of its associated pair and a respective word location in the memory means of the other computer of its associated pair, and each of said gating circuits being connected to be selectively enabled by either computer of its associated pair, whereby either computer of a respective pair can enable the gating circuit associated with said pair and can simultaneously transmit a word to and receive a word from the other computer of said pair.

2. Apparatus according to claim 1 in which each of said computers includes an instruction register connected to receive successive instructions to be executed, and means responsive to the contents of said instruction register of each given computer for selectively enabling those respective gating circuits which are connected between word locations in the memory means of the given computer and word locations in the memory means of the others of said computers.

3. Apparatus according to claim 1 in which said gating circuits include a first gating circuit operable upon enablement to transfer a word from a first of said computers to a second of said computers and a second gating circuit operable upon enablement to transfer a word from said second of said computers to said first of said computers, said first and second computers each including a respective instruction register; first switching means for enabling said first gating circuit; second switching means for enabling said second gating circuit; and means responsive to the contents of either of said instruction registers for controlling said switching means.

4. Apparatus according to claim 1 in which each of said memory means comprises a plurality of shift registers and each of said gating circuits is connected between the output line of a shift register in one of said computers and the input line of a shift register in another one of said computers.

5. Apparatus according to claim 1 wherein said word location in the memory means of a first of said computers comprises a first shift register having input and output terminals, said word location in the memory means of a second of said computers comprises a second shift register having input and output terminals, a first of said gating circuits is connected between the output terminal of said first shift register and the input terminal of said second shift register, and a second of said gating circuits is connected between the output terminal of said second shift register and the input terminal of said first shift register.

Apparatus according to claim 1 in which the memory means of each of said computers comprises a plurality of shift registers, each of said computers includes an instruction register, each of said gating circuits includes a respective bi-stable switching means operable to enable or disable the gating circuit; timing means for providing repetitive sequences of timing signals; each of said computers including means responsive to the contents of any instruction word in its instruction register during a first portion of said sequences for selectively setting the bi-stable switching means of those gating circuits which connect word locations in the computer to word locations in other computers; and each of said computers including means responsive to the contents of an instruction word in its instruction register for selectively routing shift pulses to selected ones of the shift registers of the computer during a second portion of said sequences.

7. Apparatus according to claim 1 having means for generating repetitive sequences of timing signals, and in which each of said computers includes an instruction register connected to receive successive instructions to be executed, a first data transfer register having a bit place associated with each of the others of said computers, a second data transfer register having a bit place associated with each of the others of said computers, means controlled by the contents of said instruction register and by timing signals occurring during one portion of each of said sequences for transferring the contents of a portion of said instruction register during two successive instructions to said first and second data transfer registers, respectively, and means controlled by said individual bit places of said data transfer registers for selectively enabling said gating circuits.

8. Apparatus according to claim 1 in which said apparatus includes means for generating a sequence of control signals, each of said computers includes an instruction register, a plurality of bi-stable switching means operable to enable or disable respective ones of said gating circuits, each of said computers includes means responsive to the contents of its instruction register for selectively setting selected groups of said bistable switching means during a first portion of each sequence of control signals, each of said computers includes means responsive to the contents of its instruction register during said first portion of each sequence for shifting the contents of selected groups of its memory word locations during a second portion of each sequence, each word location of each selected group of word locations being connected to a respective gating circuit controlled by a respective bi-stable switching means of each selected group of bi-stable switching means.

9. Apparatus according to claim 1 wherein said word locations of said memory means comprise a plurality of shift registers and each of said computers includes means responsive to coded transfer instructions being executed by the computer for enabling selected ones of the group of said gating circuits which connect shift registers in its memory means to shift registers in the memory means of others of said computers.

10. Apparatus according to claim 1 in which said data interchange network includes a plurality of bistable latches, each of said gating circuits being connected to be enabled or disabled by the setting or resetting of a respective latch, and each of said latches being connected to be controlled by either one of a respective pair of computers, each of said computers including a plurality of memory control circuits for controlling the changing of data at respective word locations of its memory, and each of said latches being operable when set to enable its respective gating circuit to also apply signals to the pair of control circuits associated with the pair of word locations which are interconnected by its associated gating circuit.

* * * * *